(12) United States Patent
Fogarty

(10) Patent No.: US 10,098,360 B2
(45) Date of Patent: Oct. 16, 2018

(54) METHOD AND APPARATUS FOR REMOVING MEAT FROM CRUSTACEAN LEGS

(71) Applicant: Tim Fogarty, Moncton (CA)

(72) Inventor: Tim Fogarty, Moncton (CA)

( * ) Notice: Subject to any disclaimer, the term of this patent is extended or adjusted under 35 U.S.C. 154(b) by 0 days.

(21) Appl. No.: 15/697,550

(22) Filed: Sep. 7, 2017

(65) Prior Publication Data
US 2018/0064121 A1    Mar. 8, 2018

Related U.S. Application Data

(60) Provisional application No. 62/384,307, filed on Sep. 7, 2016.

(51) Int. Cl.
*A22C 29/00* (2006.01)
*A22C 29/02* (2006.01)

(52) U.S. Cl.
CPC .......... *A22C 29/025* (2013.01); *A22C 29/023* (2013.01)

(58) Field of Classification Search
CPC ..... A22C 29/00; A22C 29/025; A22C 29/021; A22C 29/023; A22C 29/026; A22C 29/04
USPC ........................................ 452/8–10, 12, 173
See application file for complete search history.

(56) References Cited

U.S. PATENT DOCUMENTS

| | | | | | |
|---|---|---|---|---|---|
| 3,921,256 | A | * | 11/1975 | Huebotter | A22C 29/021 100/210 |
| 4,633,547 | A | * | 1/1987 | Caroon | A22C 29/00 452/9 |
| 4,715,093 | A | * | 12/1987 | Lapeyre | A22C 29/025 452/10 |
| 5,836,266 | A | * | 11/1998 | Watanabe | A01K 61/54 119/234 |
| 5,928,072 | A | * | 7/1999 | Fulcher | A22C 29/025 452/1 |
| 6,099,399 | A | * | 8/2000 | Hearn | A22C 29/00 452/1 |
| 8,915,772 | B2 | * | 12/2014 | Zhou | A22C 29/025 452/1 |

* cited by examiner

*Primary Examiner* — Richard T Price, Jr.
(74) *Attorney, Agent, or Firm* — Bereskin & Parr LLP

(57) ABSTRACT

An apparatus for removing meat from crustacean legs includes a conveyor, and a plurality of leg meat extraction rollers. The conveyor has a crustacean body region flanked by laterally opposed crustacean leg regions. Each crustacean leg region includes a plurality of leg slots extending laterally outwardly of the crustacean body region. The leg meat extraction rollers are positioned laterally outwardly of the leg slots and oriented to receive crustacean legs moved laterally outwardly from the leg slots.

20 Claims, 18 Drawing Sheets

METHOD AND APPARATUS FOR REMOVING MEAT FROM CRUSTACEAN LEGS

FIELD

This disclosure relates to the field of methods and apparatus for removing meat from crustacean legs.

INTRODUCTION

Crustaceans, such as lobsters and crab for example, are commonly processed to remove meat from their shells. Such meat extraction can be performed by hand or by mechanical apparatus.

SUMMARY

In one aspect, a method of removing meat from crustacean legs is provided. The method comprises placing a crustacean on a conveyor, the crustacean having a plurality of crustacean legs extending from a crustacean body, the conveyor carrying the crustacean in a machine direction and the conveyor having a plurality of leg slots extending in a cross-machine direction; extending the crustacean legs outwardly from the crustacean body into the legs slots; and moving the crustacean legs along the legs slots into meat extraction rollers.

In another aspect, an apparatus for removing meat from crustacean legs is provided. The apparatus comprises a conveyor and a plurality of leg meat extraction rollers. The conveyor may have a crustacean body region flanked by laterally opposed crustacean leg regions. Each crustacean leg region may include a plurality of leg slots extending laterally outwardly of the crustacean body region. The plurality of leg meat extraction rollers may be positioned laterally outwardly of the leg slots and oriented to receive crustacean legs moved laterally outwardly from the leg slots.

In another aspect, a method of removing meat from crustacean legs is provided. The method comprises conveying a crustacean leg on a conveyor in a machine direction; and directing a flow of pressurized fluid in a cross-machine direction against the crustacean leg to move the crustacean leg outwardly in the cross-machine direction into engagement with meat extraction rollers.

In another aspect, an apparatus for removing meat from crustacean legs is provided. The apparatus comprises a conveyor sized to support a plurality of crustacean legs, a meat extraction roller positioned laterally outwardly of the conveyor, and a fluid nozzle positioned and oriented to direct a flow of pressurized fluid across the conveyor to carry a crustacean leg supported on the conveyor into engagement with the meat extraction roller.

In another aspect, a method of removing meat from crustacean legs is provided. The method comprises moving a crustacean leg into engagement with meat extraction rollers, the crustacean leg including leg meat and a shell; drawing the shell through the meat extraction rollers; and applying vacuum suction to the leg meat to resist movement of the leg meat through the meat extraction rollers with the shell.

In another aspect, an apparatus for removing meat from crustacean legs is provided. The apparatus comprises meat extraction rollers having a crustacean leg inlet and defining a downstream direction, and a suction conduit having an inlet end positioned upstream of the meat extraction rollers proximate the crustacean leg inlet, wherein the suction conduit is connectable with a suction source and is sized to receive crustacean leg meat.

In another aspect, a method of removing meat from crustacean legs is provided. The method comprises moving a crustacean leg into engagement with meat extraction rollers, the crustacean leg including leg meat and a shell; drawing the shell through the meat extraction rollers; and grasping the leg meat upstream of the meat extraction rollers using a mechanical gripper to resist movement of the leg meat through the meat extraction rollers with the shell.

In another aspect, an apparatus for removing meat from crustacean legs is provided. The apparatus comprises meat extraction rollers having an inlet path extending downstream to the meat extraction rollers, and a mechanical gripper located upstream of the meat extraction rollers. The mechanical gripper having at least two fingers. The mechanical gripper is being movable from an open position in which the fingers flank the inlet path, and a gripping position in which the fingers collectively grasp at the inlet path.

DRAWINGS

DESCRIPTION OF VARIOUS EMBODIMENTS

Figure 1:
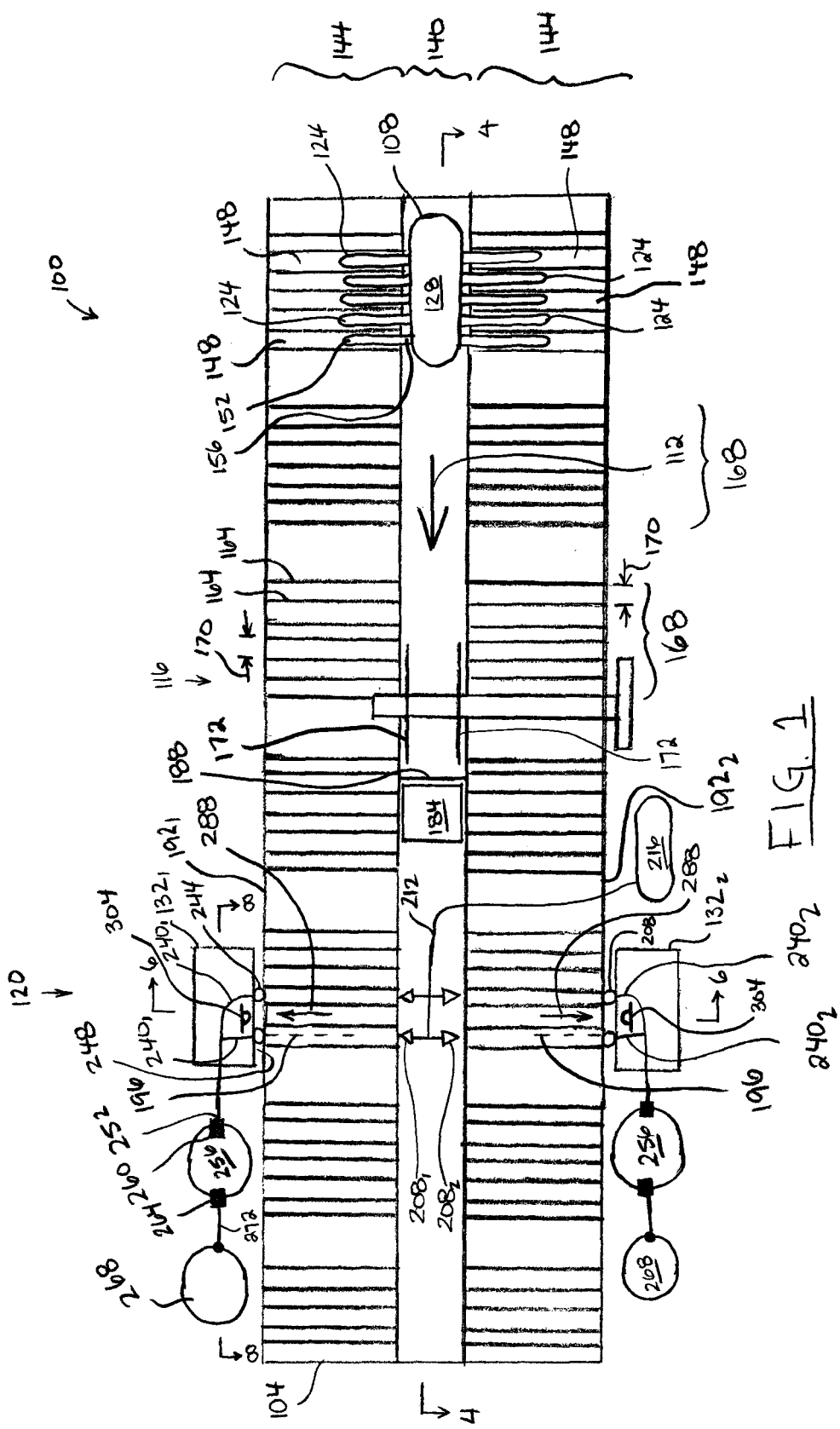
FIG. 1 is a schematic plan view of an apparatus for removing meat from crustacean legs, in accordance with an embodiment.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

As used herein and in the claims, a first element is said to be "received" in a second element where at least a portion of the first element is received in the second element unless specifically stated otherwise.

In the drawings, where there are several instances of a part or element, a subset of those instances may be labelled with numbers to avoid cluttering the drawing.

Machine removal of crustacean meat can reduce labor costs and increase efficiency, however cleanly removing meat from the shell of some body parts, such as legs, has been challenging. A premium price can be obtained for large, intact pieces of crustacean meat. Therefore, it would be desirable to provide an apparatus that can remove meat from crustacean legs without mangling or shredding the meat, and to do so with high consistency.

Figure 2:
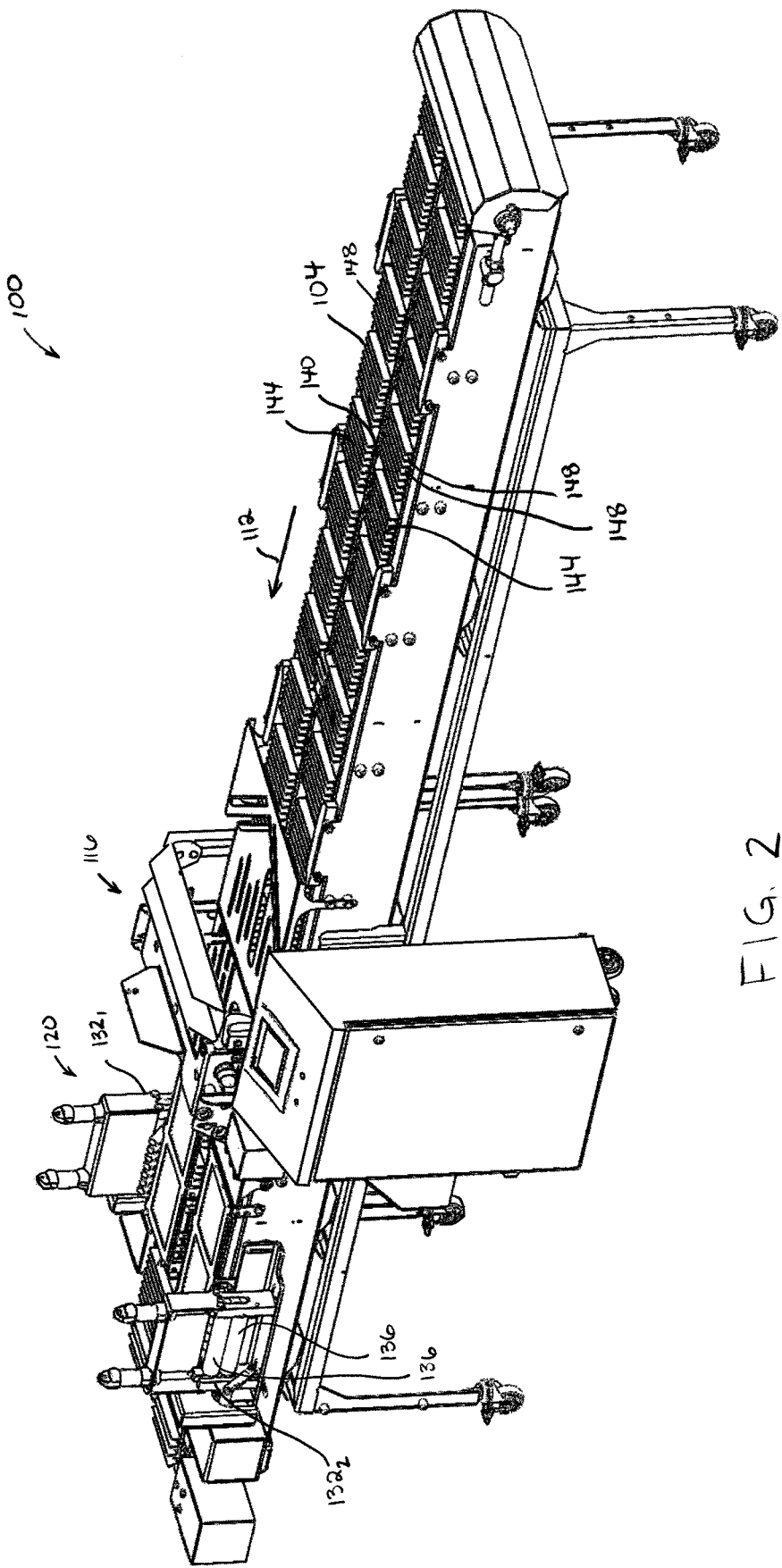
FIG. 2 is a perspective view of the apparatus of FIG. 1.

FIGS. 1-2 show an apparatus 100 for removing meat from crustacean legs. As shown, apparatus 100 includes a conveyor 104 for carrying a crustacean 108 in a machine direction 112 to cutting and meat extraction stations 116 and 120. At cutting station 116, crustacean legs 124 are severed from crustacean body 128. Conveyor 104 carries at least the severed legs in the machine direction 112 to meat extraction station 120 where the legs are moved into engagement with pairs $132_1$ and $132_2$ of meat extraction rollers 136. The meat extraction rollers $132_1$ and $132_2$ draw the shell of a crustacean leg 124 downstream through the rollers $132_1$ and $132_2$, which squeezes the meat inside the shell out through the severed proximal end of the crustacean leg 124. The squeezed out leg meat is collected.

Still referring to FIGS. 1-2, conveyor 104 may be a belt-type conveyor including a central body region 140 sized to accommodate a crustacean body 128, and two leg regions 144 positioned on opposite lateral sides of conveyor body region 140. Each leg region 144 includes a plurality of leg slots 148 which extend outwardly from the central body region 140 in a cross-machine (or "lateral") direction. Each leg slot 148 is sized to accommodate at least a crustacean leg 124.

Referring to FIG. 1, in use, a crustacean 108 is placed (e.g. by hand or by machine) onto conveyor 104 such that the crustacean body 128 is carried on conveyor body region 140, and the crustacean legs 124 extend laterally outwardly from crustacean body 128 into leg slots 148. As shown, each crustacean leg 124 may be received in a different one of leg slots 148.

In the meat extraction station, leg slots 148 align crustacean legs 124 with a downstream direction 288 through the meat extraction rollers 132. The leg slots 148 help straighten crustacean legs 124, which may have a natural inclination to curve. This helps with moving crustacean legs 124 axially through meat extraction rollers 132 beginning with the distal leg end 152 and ending with the severed proximal leg end 156. In turn, this allows the leg meat to be pushed out cleanly through the severed proximal leg end 156. In contrast, when a misaligned crustacean leg 124 is moved through meat extraction rollers 132, the leg meat will tend to rupture an exit opening in the shell and become shredded or mangled thereby destroying much of the value of the leg meat.

Figure 3:
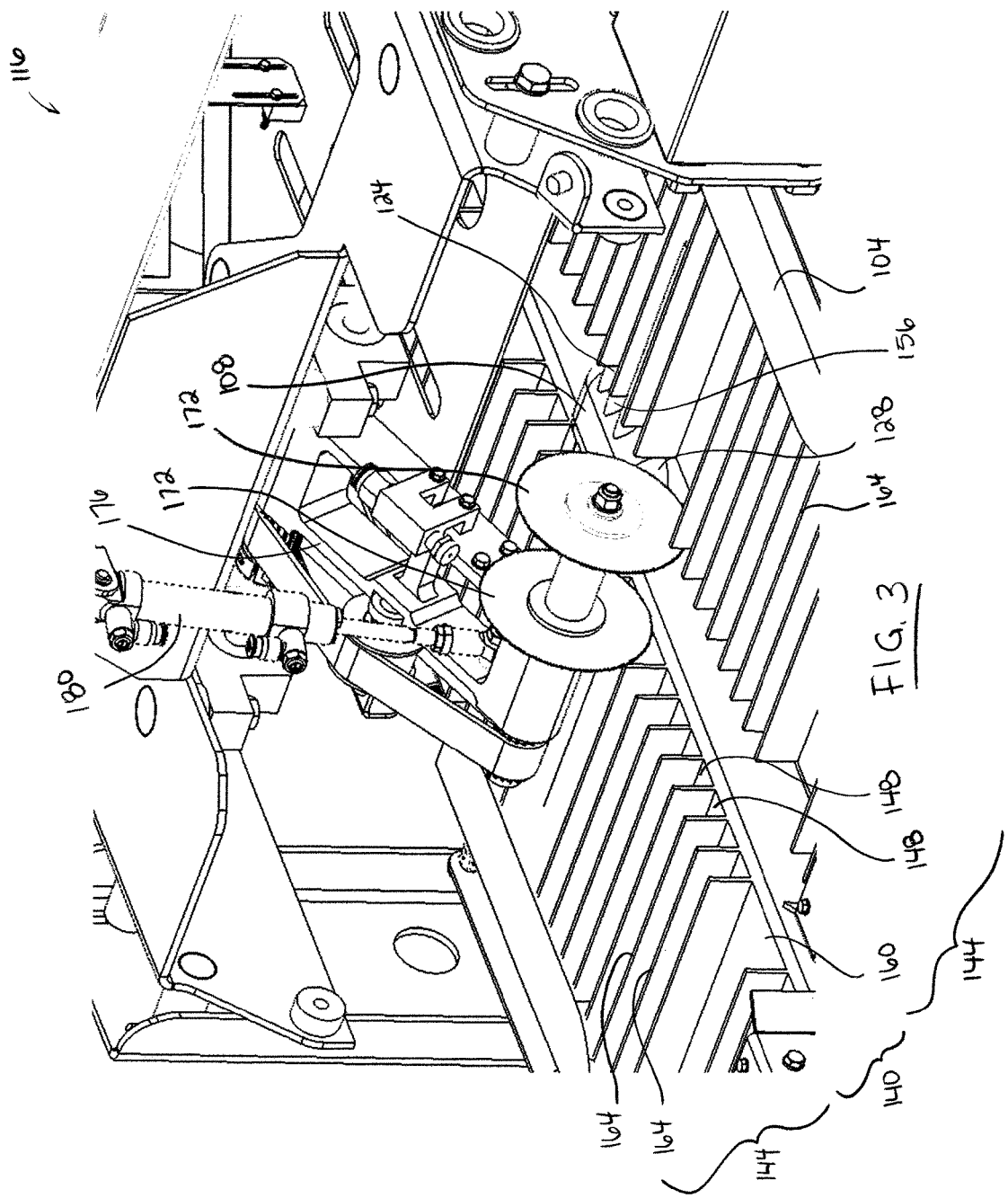
FIG. 3 is a perspective view of a cutting station of the apparatus of FIG. 1.

Referring to FIG. 3, conveyor leg slots 148 can be formed in any manner. In the illustrated example, conveyor 104 includes a floor 160 that supports a plurality of upstanding slot walls 164. As shown, leg slot walls 164 extend laterally outwardly across a conveyor leg region 144, and terminate at or laterally outboard of conveyor body region 140. In FIG. 1, leg slot walls 164 within a leg region 144 are shown spaced apart in the machine direction 112 to define leg slots 148 therebetween.

Still referring to FIG. 1, leg slots 148 may be arrayed continuously across the machine direction length of conveyor 104, or may be organized into spaced apart groups 168 of leg slots 148 as shown. Each leg slot group 168 may be configured to accommodate one crustacean 108. For example, a slot group 168 may include at least 5 leg slots in each conveyor leg region 144 for processing lobster or crab, which have 10 legs (or at least 4 leg slots in each conveyor leg region 144 where the front claws are removed). Leg slots 148 of the laterally opposed conveyor leg regions 144 may be laterally aligned, as shown, to receive crustacean legs 124 which are typically symmetrically arranged in a crustacean 108. Alternatively, one or more or all of leg slots 148 may be laterally misaligned as between the laterally opposed conveyor leg regions 144.

Conveyor leg slots 148 can have any machine-direction width 170 suitable to accommodate a crustacean leg 124. For example, leg slot width 170 may be between 0.1 and 1.5 inches, such as between 0.1 and 1.5 inches for crab or between 0.1 and 1 inches for lobster. In some embodiments, all conveyor leg slots 148 have the same leg slot width 170. This can allow crustacean legs 124 to be easily moved into leg slots 148 without having to register the machine-direction placement of legs 124 on conveyor 104. In other embodiments, conveyor 104 may include leg slots 148 having a plurality of different widths 170. For example, leg slots 148 may be sized and arranged on conveyor 104 according to the ordered sizing of crustacean legs 124 of a particular type of crustacean 108. This can allow leg slots 148 to provide a more tailored fit to the crustacean legs 124 of that crustacean 108 and thereby better align and straighten the crustacean legs 124 in the cross-machine direction.

Figure 4:
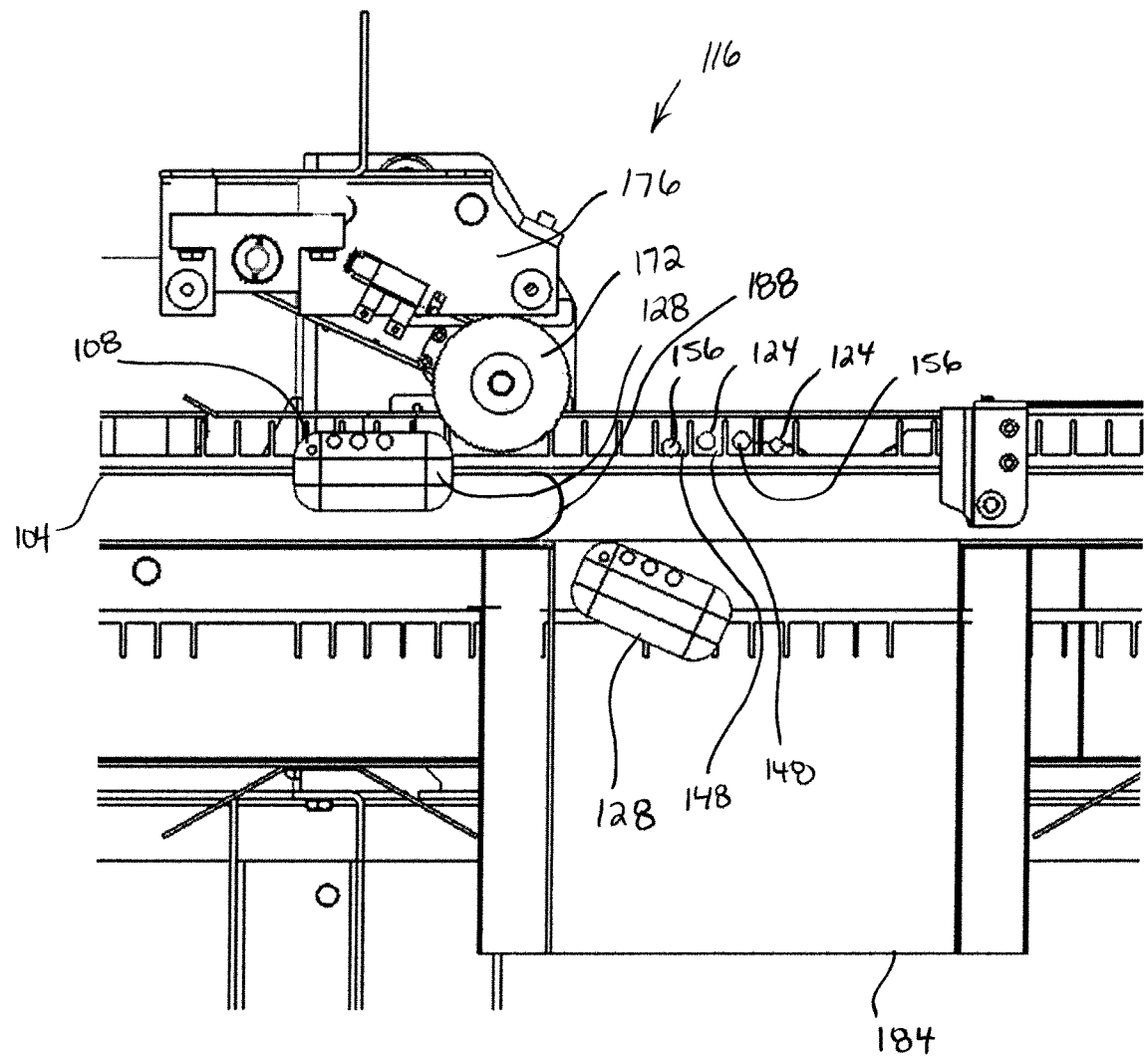
FIG. 4 is a cross-sectional view of the cutting station taken along line 4-4 in FIG. 1.

Conveyor 104 carries crustacean 108 downstream to cutting station 116 where legs 124 are severed from body 128. Referring to FIGS. 3 and 4, cutting station 116 is shown including cutting blades 172. Cutting blades 172 can have any configuration suitable for severing legs 124 from body 128. In the illustrated embodiments, cutting station 116 includes two cutting blades 172 positioned on laterally opposite ends of conveyor body region 140 for cutting through proximal leg ends 156. As shown, cutting blades 172 may be positioned laterally inboard of leg slot walls 164.

Cutting blades 172 can be positioned anywhere in the path of proximal leg ends 156 as conveyor 104 carries crustacean 108 in the machine direction. For example, cutting blades 172 may be positioned above conveyor 104 as shown, or extend through a slot in conveyor floor 160. In the illustrated embodiments, cutting blades 172 are mounted to a blade frame 176 above conveyor 104, which suspends cutting blades 172 just above conveyor floor 160. Optionally, cutting blades 172 may be vertically movable relative to conveyor 104 between a storage position and cutting position, or else have a fixed position relative to conveyor 104. In the illustrated embodiment, blade frame 176 is movable by actuation of a fluidic piston 180 (e.g. hydraulic or pneumatic).

Cutting blades 172 can be any type of cutting device suitable for severing legs 124 from body 128. For example, cutting blades 172 can be circular saw blades as shown, or reciprocating blades for example.

Referring to FIGS. 1 and 4, the conveyor body region 140 may end in the machine direction after cutting blades 172 as shown, or extend past meat extraction station 120. In the illustrated embodiment, conveyor body region 140 ends between cutting and meat extraction stations 116 and 120. A body collection receptacle 184 (e.g. a bucket, box, or tank) may be positioned below the machine direction end 188 of conveyor body region 140 to collect crustacean bodies 128, that fall from the conveyor body region end 188. In some embodiments, body collection receptacle 184 is a hopper or conduit that directs collected crustacean bodies 128 to another apparatus for further processing.

Figure 5:
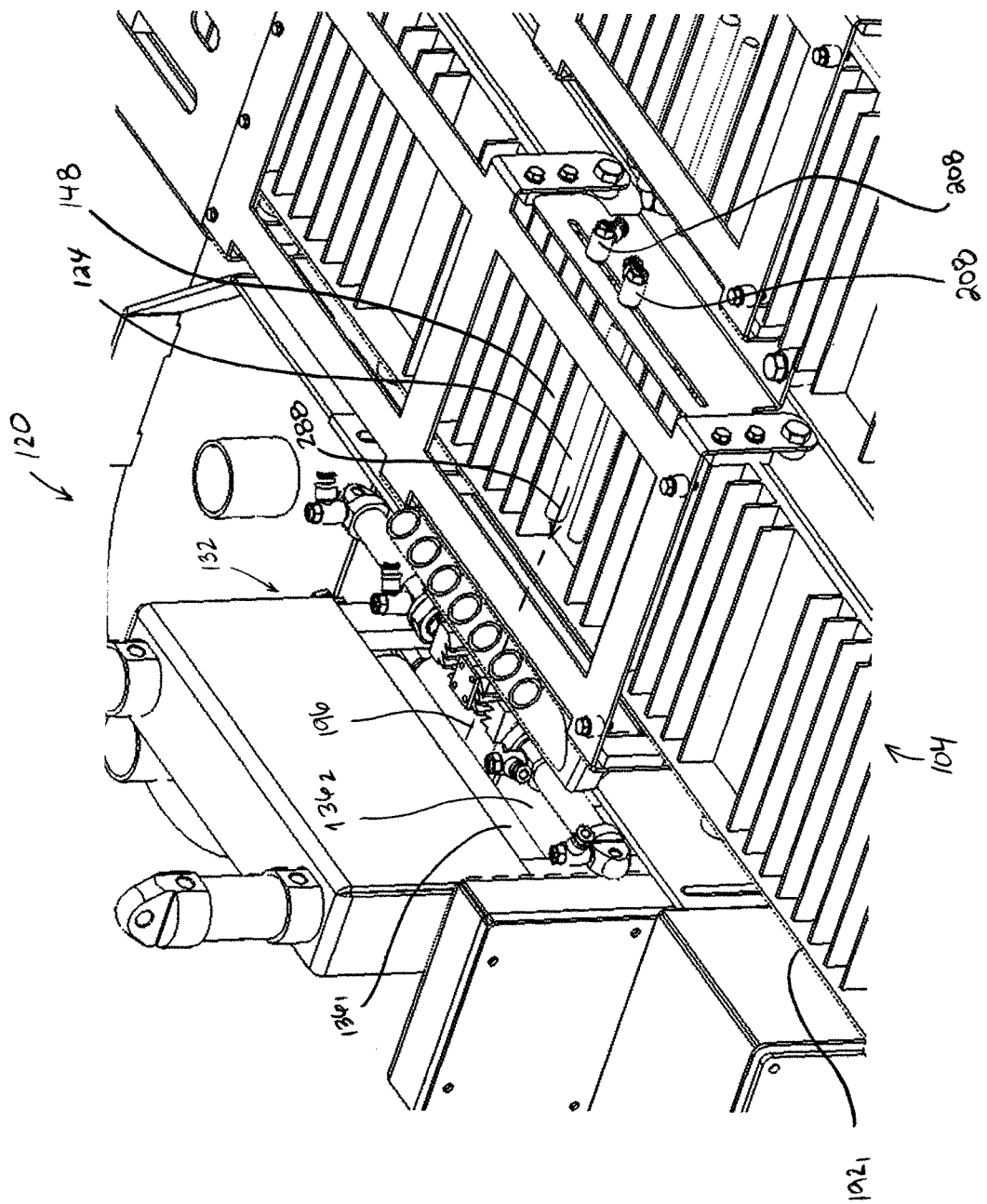
FIG. 5 is a partial perspective view of a meat extraction station of the apparatus of FIG. 1.

Referring to FIGS. 1 and 5, during and after cutting by cutting blades 172, crustacean legs 124 remain positioned in leg slots 148. Conveyor 104 carries the severed crustacean legs 124 in the machine direction to meat extraction station 120. As shown, meat extraction station 120 includes two pairs 132 of meat extraction rollers 136. Meat extraction rollers 132 are positioned outboard of opposite lateral ends 192 of conveyor 104 to receive crustacean legs 124. As shown, each roller pair 132 can include an upper roller $136_1$ and a lower roller $136_2$ that together define an inlet path 196 that extends in a downstream direction 288 between the rollers 136. In the illustrated example, rollers 136 are oriented in the machine direction so that the inlet path 196 extends downstream in the cross-machine direction.

Figure 7:
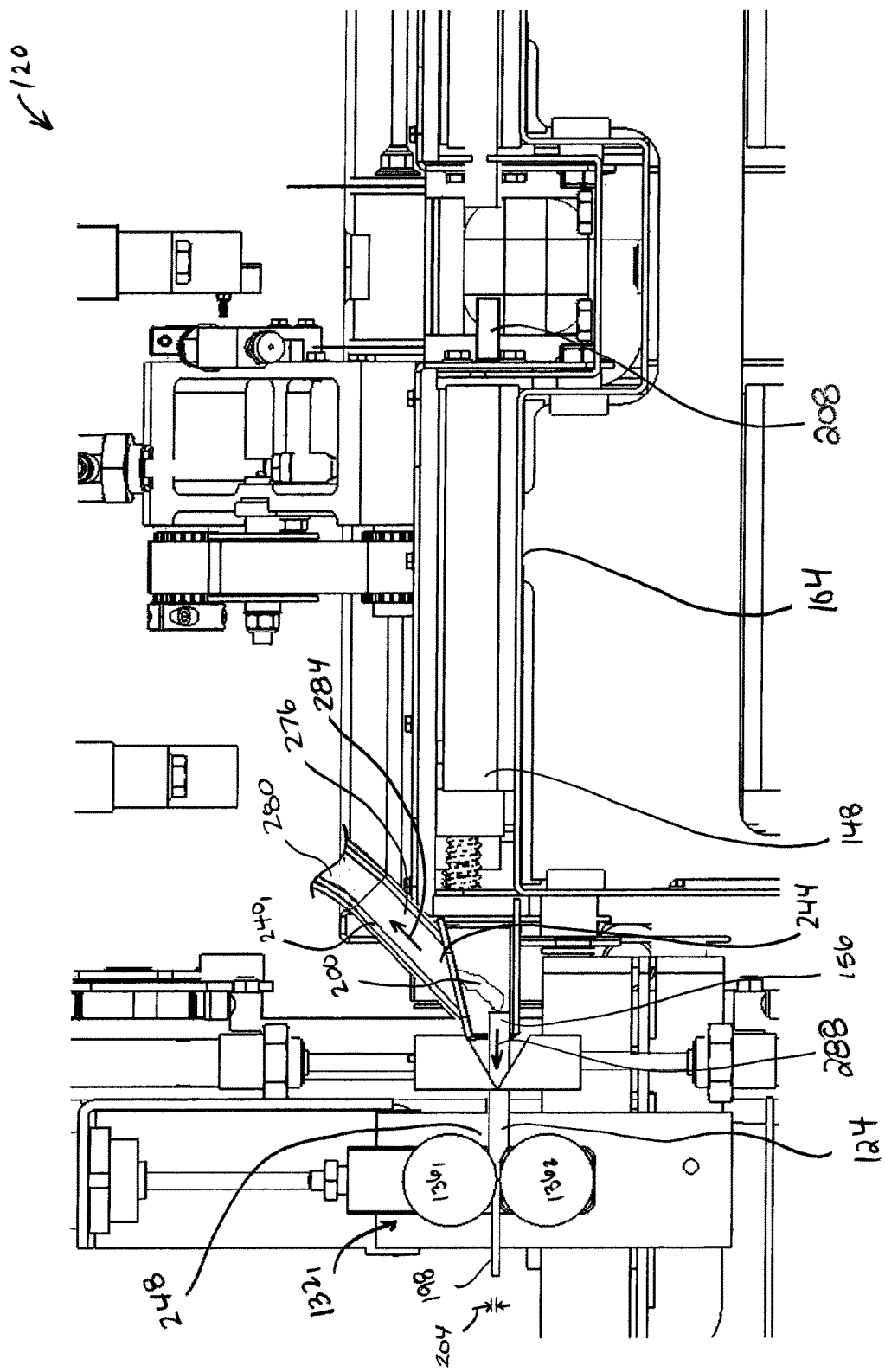
FIG. 7 is a partial cross-sectional view of the meat extraction station taken along line 6-6 in FIG. 1, and showing leg meat being extracted from a leg shell.

In use, conveyor 104 carries a severed crustacean leg 124 into the meat extraction station 120 where the crustacean leg 124 aligns with a roller pair 132. The crustacean leg 124 is then moved laterally outwardly along the conveyor leg slot 148 in which it is situated and along the roller inlet path 196 into engagement with the roller pair 132. The leg distal end makes first engagement with the rollers 132. As shown in FIG. 7, the leg shell 198 is drawn downstream through the rollers 132 (i.e. between the rollers 136 of the pair 132), and leg meat 200 is squeezed out through the severed proximal leg end 156.

Crustacean legs 124 can be moved along conveyor leg slots 148 into engagement with rollers 132 in any manner. For example, crustacean legs 124 may be moved into engagement with rollers 132 by gravity (e.g. by tilting conveyor 104), manually (e.g. by hand), or by fluid pressure.

Gravitational movement of crustacean legs 124 can provide motive force without additional equipment. However, as gravity moves crustacean legs 124 with relatively little force, a larger gap 204 between rollers 136 of the pair 132 may be required to obtain engagement (i.e. for the rollers to "bite"). Undesirably, a larger gap 204 (e.g. exceeding 0.5 inches) may allow some smaller crustacean legs 124 to pass through the rollers 132 whole without extracting any meat.

Manual movement of crustacean legs 124 can allow human actors to apply the requisite force when moving crustacean legs 124 by hand into engagement with rollers 132. This can allow gap 204 between rollers 132 to be reduced or eliminated. However, the use of human actors increases the labor operating costs of apparatus 100, and introduces safety concerns associated with fingers near rollers 132.

Figure 6:
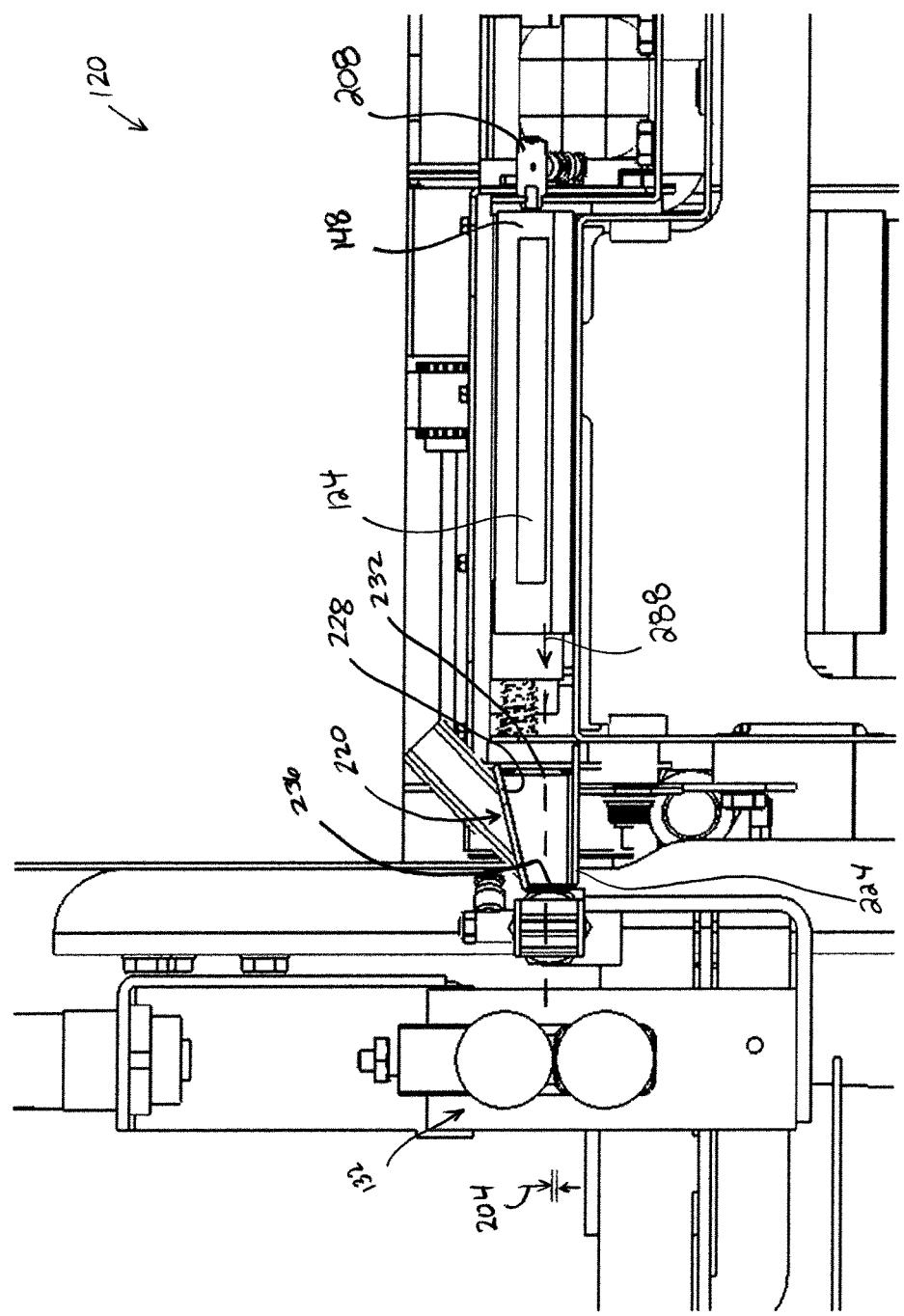
FIG. 6 is a partial cross-sectional view of the meat extraction station taken along line 6-6 in FIG. 1.

Turning to FIGS. 5-7, in the illustrated example, crustacean legs 124 are moved into engagement with rollers 132 by fluid pressure. The fluid pressure can apply sufficient force to avoid the need for a large roller gap 204 which could let smaller legs 124 through whole, and avoids the labor costs associated with manual leg movement. As exemplified, meat extraction station 120 includes a plurality of fluid nozzles 208 oriented to direct pressurized fluid laterally outwardly against a crustacean leg 124 in a leg slot 148 to move the crustacean leg 124 laterally outwardly along the leg slot 148 into engagement with meat extraction rollers 132. The force of the fluid pressure can allow roller gap 204 to be reduced or substantially eliminated. For example, roller gap 204 may be less than 0.5 inches (e.g. 0 inches, or 0 to 0.5 inches), which can help prevent small legs from passing through rollers 132 whole.

Referring to FIG. 1, meat extraction station 120 can include any number of fluid nozzles. In the illustrated example, meat extraction station 120 includes four fluid nozzles, with two fluid nozzles $208_1$ facing outwardly towards conveyor lateral end $192_1$ and roller pair $132_1$, and two fluid nozzles $208_2$ facing in an opposite direction towards conveyor lateral end $192_2$ and roller pair $132_2$. As shown, fluid nozzles $208_1$ and $208_2$ may be positioned laterally inboard of conveyor leg regions 144. This allows fluid nozzles $208_1$ and $208_2$ to direct pressurized fluid against proximal leg end 156. For example, fluid nozzles $208_1$ and $208_2$ may be positioned in the space between conveyor leg regions 144 made available after conveyor body region end 188 as shown, or may be positioned between conveyor body and leg regions 140 and 144.

Fluid nozzles 208 can emit any fluid suitable for moving crustacean legs 124 into engagement with meat extraction rollers 132. For example, fluid nozzles 208 may emit a liquid (e.g. water), a gas (e.g. air), or both. As shown, fluid nozzles 208 may be connected by fluid lines 212 to a pressurized fluid source 216. Fluid source 216 can be any source of pressurized fluid, such as a gas compressor, liquid pump, a compressed fluid tank, or a municipal water supply line for example. All fluid nozzles 208 may be connected to the same fluid source 216 as shown, or one or more (or all) fluid nozzles 208 may be connected to different fluid sources.

Referring to FIG. 6, in some embodiments, a funnel 220 is positioned between conveyor leg slots 148 and rollers 132 to help better align crustacean leg 124 when moved into engagement with rollers 132. In the illustrated example, funnel 220 includes a funnel lower wall 224 and a funnel upper wall 228 that together define a funnel inlet end 232 proximate conveyor slot 148, and a funnel outlet end 236 proximate rollers 132 outboard of funnel inlet end 232. As shown, funnel upper wall 228 may be angled downwardly toward funnel lower wall 224 in an outward direction towards rollers 132 in alignment with roller inlet path 196. This can allow funnel 220 to urge crustacean legs 124 to flatten and straighten as the legs 124 are moved into engagement with meat extraction rollers 132.

Referring to FIG. 7, leg meat 200 that is squeezed out of a leg shell 198 by meat extraction rollers 132 can be removed and collected in any manner. For example, the leg meat 200 can be manually removed by grasping the meat by hand and depositing the leg meat 200 into a collection bin. However, this adds labor costs and there are safety issues associated with fingers being near the operating extraction rollers 132. In the illustrated example, leg meat 200 is pulled away from leg shell 198 by vacuum suction. This allows leg meat 200 to be withdrawn by machine, which saves on labor costs, improves safety, and can increase productivity.

Figure 8:
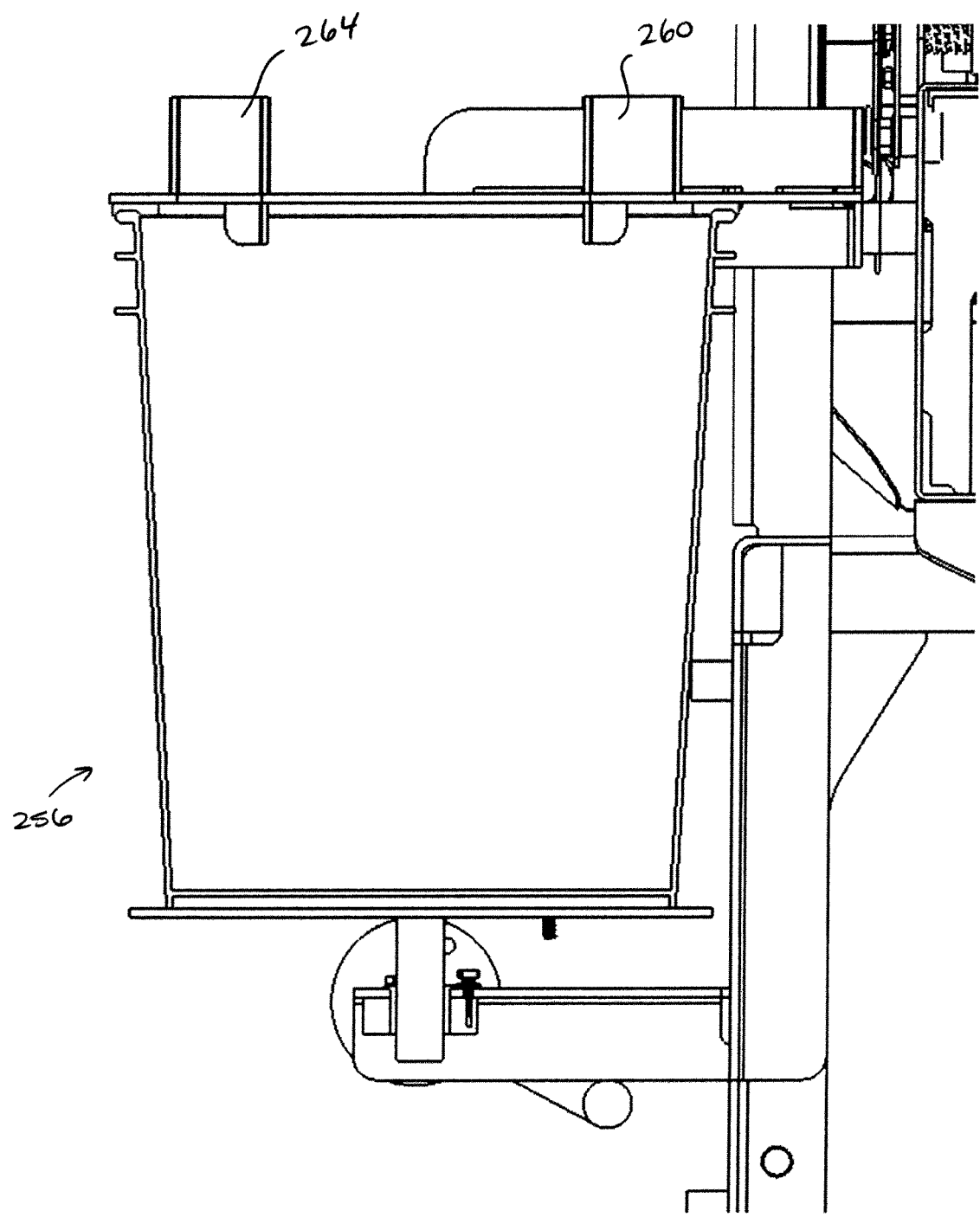
FIG. 8 is a cross-sectional view of a leg meat collection receptacle taken along line 8-8 in FIG. 1.

Referring to FIGS. 1 and 7, meat extraction station 120 is shown including a suction conduit $240_1$ having a suction conduit inlet end 244 positioned upstream of meat extraction rollers $132_1$ proximate roller leg inlet 248 to suction extracted leg meat 200. Suction conduit $240_1$ also includes a suction conduit outlet end 252 fluidly connected to a leg meat collection receptacle 256. Turning to FIGS. 1 and 8, leg meat collection receptacle 256 may include an inlet port 260 that connects to suction conduit outlet end 252 for receiving suctioned leg meat, and an outlet port 264 fluidly coupled to a suction source 268 (e.g. air pump). Outlet port 264 may be fluidly coupled to suction source 268 in any manner, such as by gas line 272.

Referring again to FIG. 7, suction conduit $240_1$ may include an inlet nozzle 276 (FIG. 7) connected to a gas line 280 (FIG. 1). Meat extraction station 120 can include any number of suction conduits. In the example of FIG. 1, meat extraction station 120 includes two suction conduits $240_1$ associated with meat extraction rollers $132_1$ and two suction conduits $240_2$ associated with meat extraction rollers $132_2$. This can allow meat extraction station 120 to extract meat from multiple crustacean legs 124 simultaneously. As shown, suction conduits $240_1$ and $240_2$ may include associated fluid nozzles 208 positioned to apply suction proximate to where crustacean legs 124 engage meat extraction rollers $132_1$ and $132_2$ (and hence where leg meat will be squeezed out of the crustacean legs 124).

Referring to FIG. 7, suction conduit inlet end 244 can define any suction direction 284 suitable for pulling leg meat 200 from leg shells 198. In the illustrated example, suction direction 284 includes a laterally inwardly direction component that is opposed to the downstream direction 288 of rollers 132. This allows the suction from conduit 240 to pull leg meat 200 away from the leg shell 198 which is being drawn in the downstream direction 288 through rollers 132.

Apparatus 100 can include any number of leg meat collection receptacles 256 and suction sources 268. FIG. 1 shows an example including a different leg meat collection receptacle 256 and suction source 268 associated with each meat extraction roller pair 132. In alternative embodiments, apparatus 100 includes just one leg meat collection receptacle 256 and one suction source 268. In this case, all leg meat extracted at both roller pairs 132 may be deposited into the same receptacle 256 by suction developed by the same suction source 268.

Figure 9:
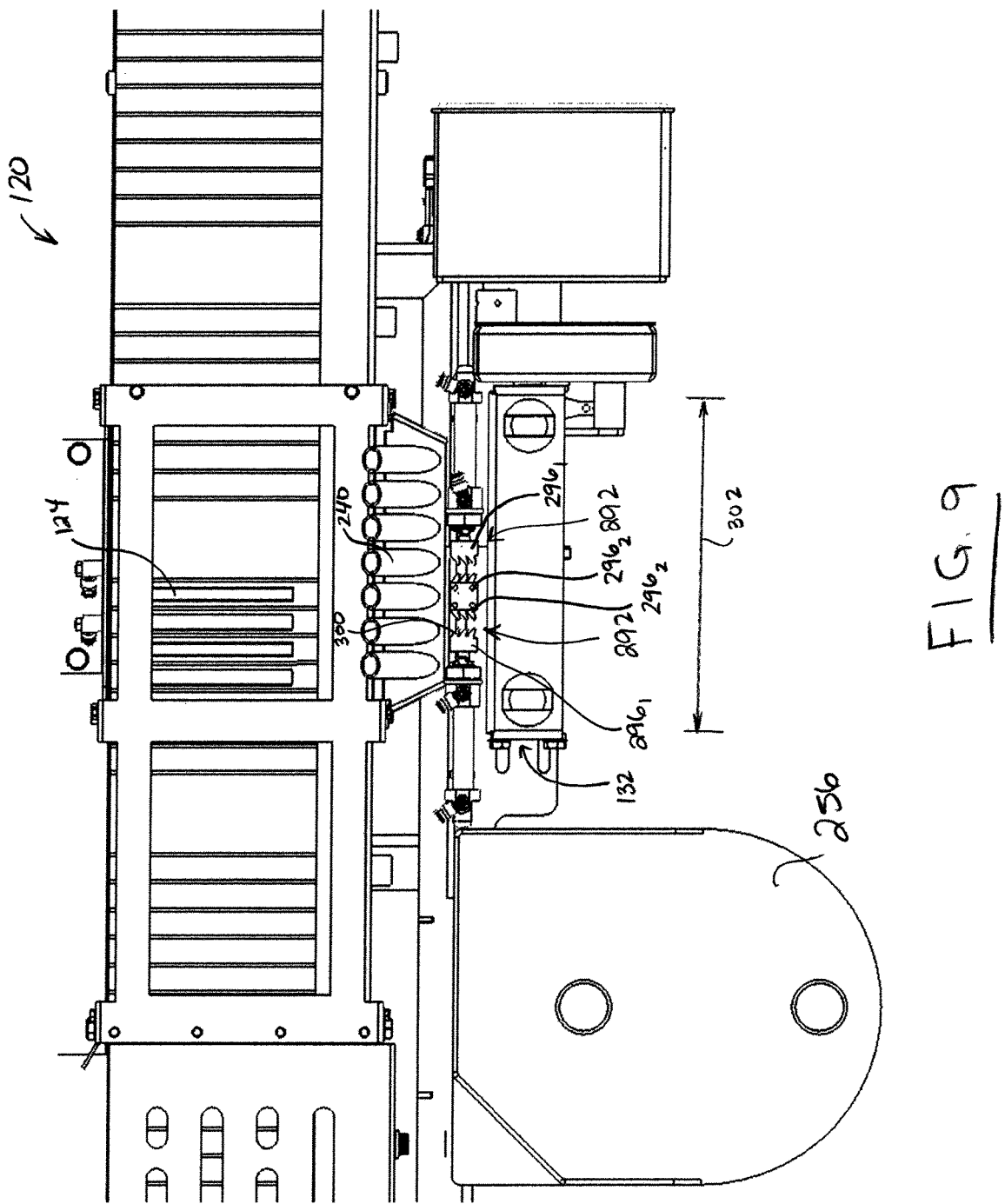
FIG. 9 is a partial top plan view of the meat extraction station of the apparatus of FIG. 1.

Reference is now made to FIG. 9. The leg meat of some crustacean legs 124 can be more difficult to remove from the leg shell. For example, leg meat from cooked crustacean legs 124 can be strongly bonded to the leg shell. In some embodiments, apparatus 100 includes one or more mechanical grippers 292 that grasp (e.g. close in on, like a vice) leg meat as it is squeezed out of the leg shell to supplement or substitute the vacuum suction force.

As exemplified, each mechanical gripper 292 includes at least two gripper fingers 296, which are collectively movable from an open position in which the fingers flank the roller inlet path 196 to a closed position in which the fingers collectively grasp at the inlet path 196 where leg meat is squeezed out. Gripper fingers 296 can have any structure and material composition suitable for grasping leg meat. In the illustrated example, gripper fingers 296 have jagged engagement faces 300 that can improve grip. Gripper fingers 296 may be made of a resiliently deformable material such as rubber, which can help avoid damaging the leg meat.

Gripper fingers 296 can be actuated in any manner. In the illustrated example, each mechanical gripper 292 includes a stationary gripper finger $296_1$ and a movable gripper finger $296_2$. The movable gripper finger $296_2$ is shown connected to a fluidic piston (e.g. pneumatic or hydraulic) which can be selectively activated to move the gripper finger $296_2$ towards the stationary gripper finger $296_1$ from the open position to the gripping position. In the open position, gripper fingers $296_1$ and $296_2$ are spaced apart by a distance sufficient to allow a crustacean leg 124 to move downstream into engagement with rollers 132. In the closed position, gripper fingers $296_1$ and $296_2$ close in on the crustacean leg to contact and grasp the leg meat, whereby the gripper fingers $296_1$ and $296_2$ resist downstream movement of the leg meat as the leg shell is pulled downstream through the rollers 132.

Mechanical grippers 292 can have any orientation. In the illustrated example, gripper fingers $296_1$ and $296_2$ are horizontally spaced apart and aligned, and collectively move horizontally from the open position to the gripping position. This can help prevent gripper fingers $296_1$ and $296_2$ from blocking the airflow path of the suction nozzles. In alternative embodiment, gripper fingers $296_1$ and $296_2$ may be vertically spaced apart and aligned, and collectively move vertically from the open position to the gripping position. This can allow for a more compact arrangement of gripper fingers $296_1$ and $296_2$ whereby a greater number of mechanical grippers 292 can be positioned along the roller width 302 of meat extraction rollers 132.

Referring to FIGS. 1 and 9, apparatus 100 may include one or more sensors 304 (FIG. 1) that detect when a crustacean leg 124 is moved towards engagement with meat extraction rollers 132. Sensor 304 (FIG. 1) can be any type of sensor suitable for such detection, such as an infrared or laser beam break sensor for example. Mechanical grippers 292 (FIG. 9) may be communicatively coupled to sensors 304 (FIG. 1). For example, mechanical grippers 292 (FIG. 9) may be configured to move from the open position to the gripping position in response to sensor 304 (FIG. 1) detecting a crustacean leg 124 moving towards engagement with meat extraction rollers 132. In some embodiments, mechanical grippers 292 (FIG. 9) may activate to move to the gripping position after a predetermined time delay following a detection from sensor 304 (FIG. 1). In some embodiments, mechanical grippers 292 (FIG. 9) may deactivate (i.e. move to the open position) after sensor 304 (FIG. 1) (or another sensor) detects that the leg shell has been pulled through the rollers 132 or after a predetermined time following activation of the mechanical gripper 292 (FIG. 9). This can allow vacuum suction from suction conduit 240 to carry the extracted leg meat away to leg meat collection receptacle 256.

Figure 10:
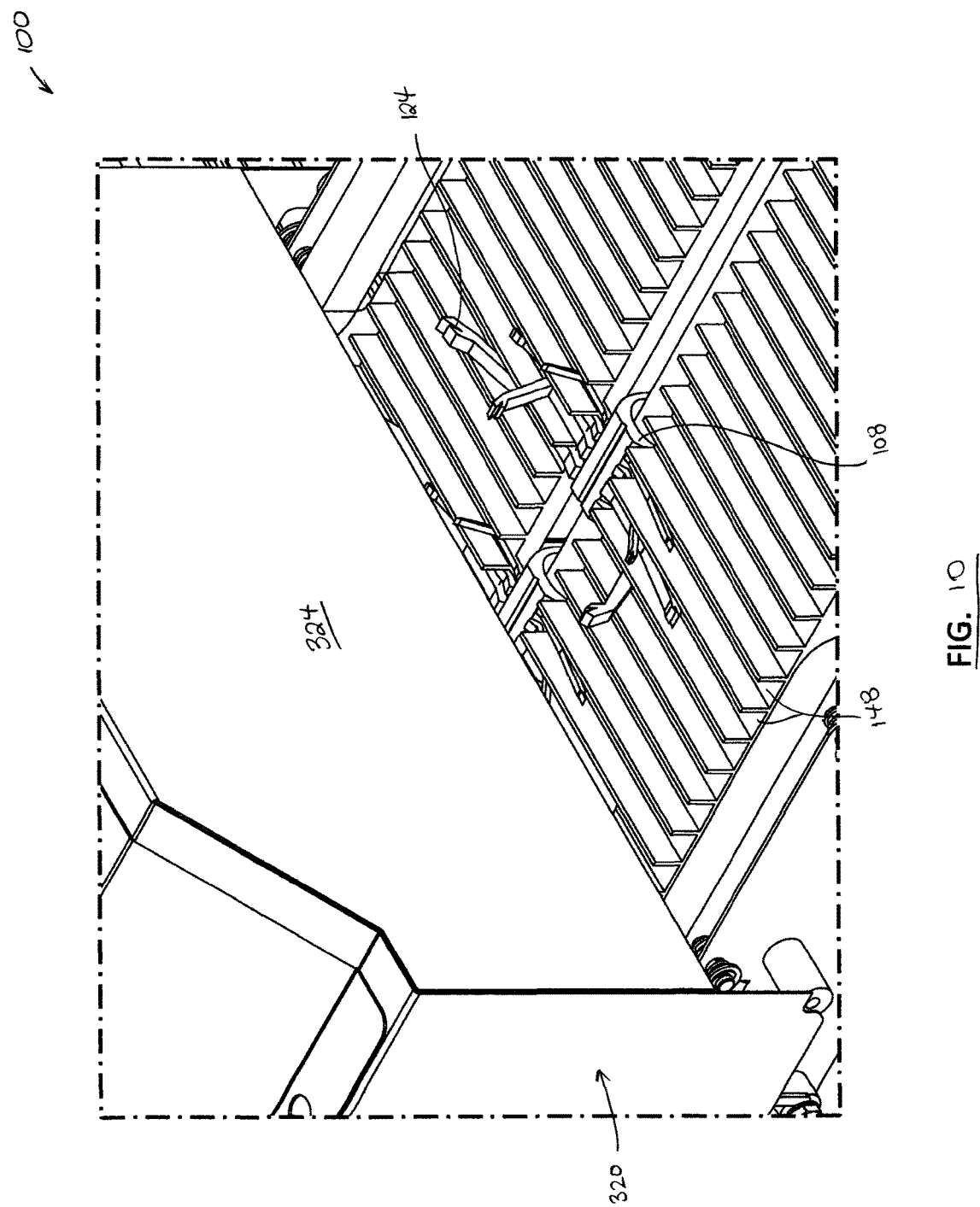
FIG. 10 is a perspective view of a leg straightening station of an apparatus in accordance with another embodiment.
Figure 11:
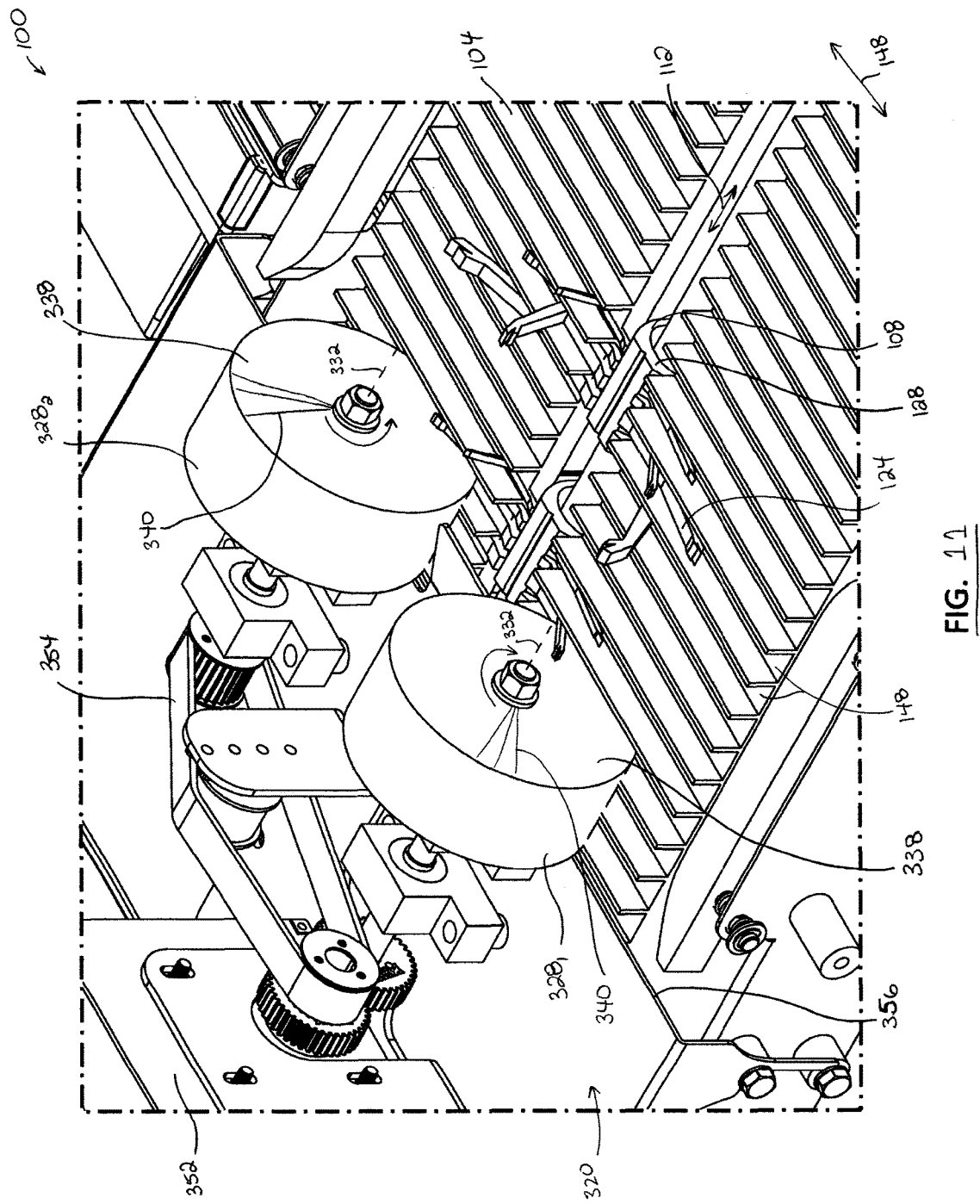
FIG. 11 is the perspective view of the leg straightening station of FIG. 10 with a cover removed.
Figure 12:
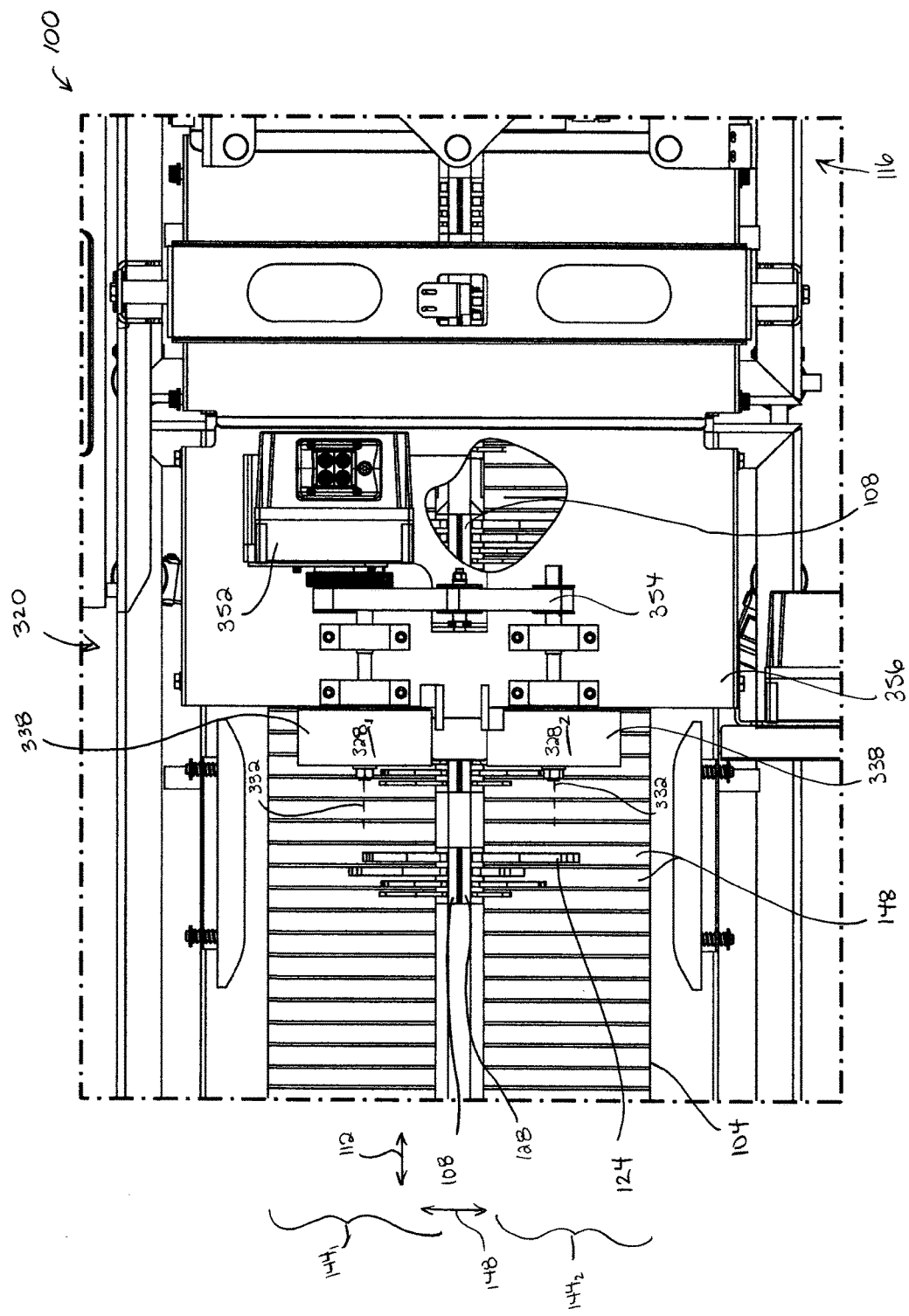
FIG. 12 is a top plan view of the leg straightening station of FIG. 10 with the cover removed.

Referring to FIGS. 10-12, apparatus 100 is shown in accordance with another embodiment. As shown, apparatus 100 may include a leg straightening station 320 positioned upstream of the leg cutting and meat extraction stations 116 and 120 (FIG. 1). Crustacean legs 124 of pre-cooked (i.e. partially or fully cooked) crustaceans 108 may tend to curl. In some cases, it may be problematic to properly feed curled crustacean legs 124 into meat extraction rollers. At leg straightening station 320, crustacean legs 124 are straightened (e.g. at least partially uncurled) to extend more completely within conveyor leg slots 148. The straightened conveyor legs 124 may be more successfully moved axially through meat extraction rollers, which may result in greater meat extraction efficiency.

FIGS. 11 and 12 show leg straightening station 320 (FIG. 10) with cover 324 removed so that the internal components can be seen. As shown, leg straightening station 320 may include a plurality of brush rollers 328. Each brush roller 328 is positioned to brush into conveyor leg slot 148 outwardly in cross-machine (i.e. lateral) direction 114. For example, each brush roller 328 may have a rotation axis 332 that is within a plane defined by machine direction 112 and vertical direction 336, and transverse to the vertical direction 336. In the illustrated example, rotation axes 332 are substantially parallel to the machine direction 112. This allows brush roller 328 to brush through conveyor leg slots 148 over crustacean legs 124 in a cross-machine direction 114 as opposed to in a machine direction 112. Consequently, brush roller 328 is able to push crustacean legs 124 laterally outwardly of crustacean body 128, and thereby straighten crustacean legs 124 to extend more completely within conveyor leg slots 148.

Leg straightening station 320 may include any number of brush rollers 328. In the example shown, leg straightening station includes two brush rollers 328 positioned to engage the conveyor leg slots 148 of different respective conveyor leg regions 144. In other embodiments, leg straightening station 320 may include a plurality of brush rollers 328 over each conveyor leg region 144.

Brush rollers 328 can have bodies 338 with any composition that allows brush rollers 328 to straighten crustacean legs 124 against their compulsion to curl, and which does not unduly obstruct machine-direction movement of conveyor 104 as leg slot walls 164 move through brush rollers 328. Brush roller bodies 338 may include any one or more of bristles (soft and/or rigid), foam, and paddles (soft and/or rigid) for example. In the illustrated example, each brush roller body 338 include at least bristles 340 (for ease of illustration, only a few discrete bristles are shown).

Brush rollers 328 may be rotated in any direction that allows brush roller bodies 338 to urge crustacean legs 124 to uncurl laterally outwardly of crustacean body 128. The brush roller(s) $328_1$ that engage conveyor leg region $144_1$ may be rotated in an opposite direction to brush roller(s) $328_2$ that engage conveyor leg region $144_2$. This allows the brush rollers $328_1$ and $328_2$ to all urge crustacean legs 124 to uncurl laterally outwardly of crustacean body 128. As shown, when viewed in a downstream direction, the brush roller(s) $328_1$ over the left conveyor leg region $144_1$ may rotate in a clockwise direction 344, and the brush roller(s) $328_2$ over the right conveyor leg region $144_2$ may rotate in a counterclockwise direction 348.

Brush rollers 328 may be driven to rotate in any manner. In the illustrated embodiment, brush rollers 328 are driven by a common motor 352. The opposite rotating directions are provided by reversing transmission 354. In other embodiments, brush rollers 328 may be separately driven by different motors.

Figure 13:
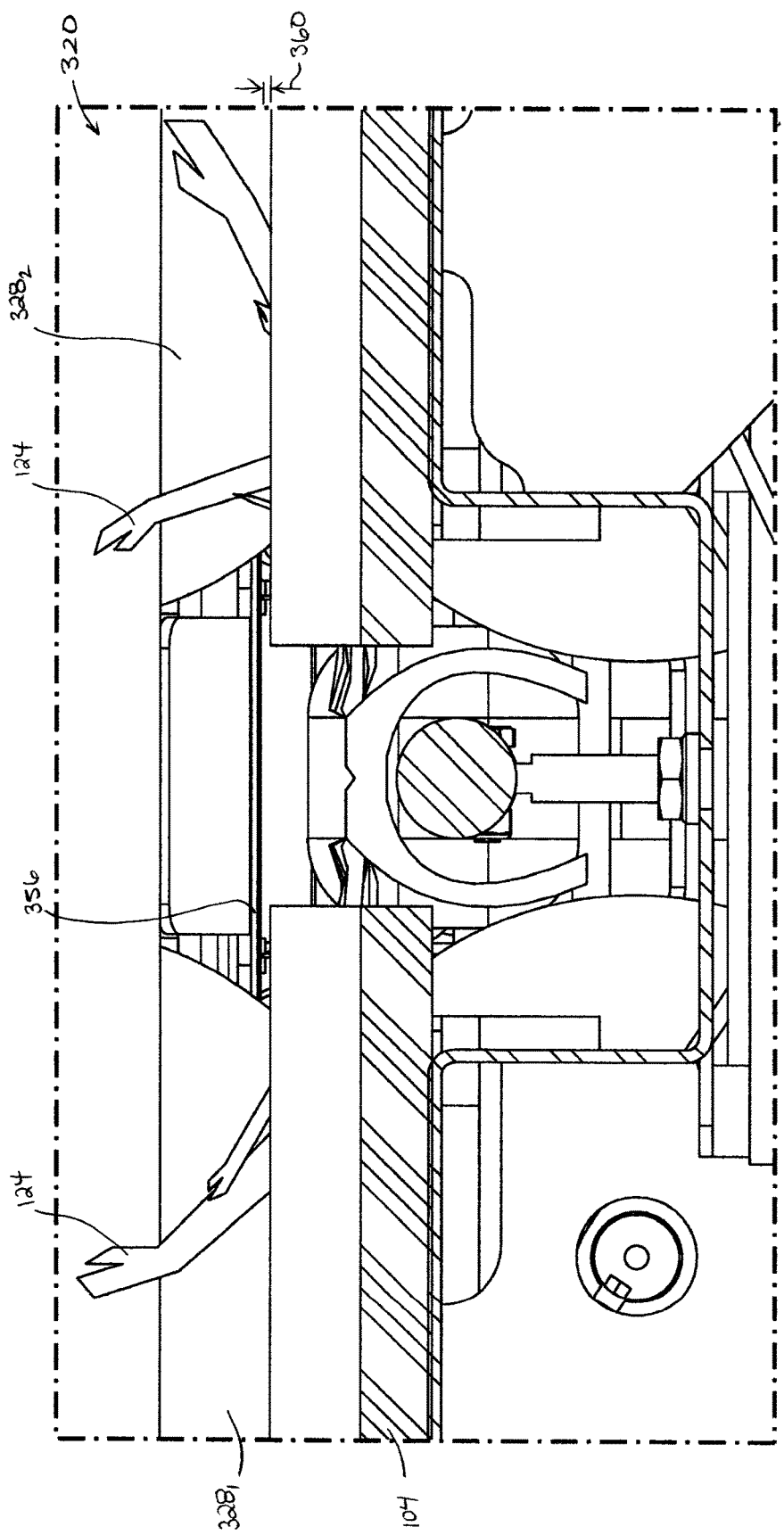
FIG. 13 is a front elevation view of the leg straightening station of FIG. 10.

Referring to FIGS. 11-13, leg straightening station 320 may further include an upper retaining wall 356 that acts to maintain the leg straightening imparted by the brush rollers 328. As shown, retaining wall 356 may extend in a downstream direction from proximate leg brush rollers 328. Retaining wall 356 may extend proximate to conveyor 104, to inhibit crustacean legs 124 from restoring their curled configuration after being straightened by brush rollers 328. In some embodiments, distance 360 between conveyor 104 and retaining wall 356 may be less than 1 cm (e.g. 0 cm to 1 cm).

In some embodiments, retaining wall 356 may extend downstream over cutting station 116 and meat extraction station 120 to maintain the straightened state of crustacean legs 124. FIG. 12 shows a partial cutaway through retaining wall 356 to show crustacean 108 below.

Figure 14:
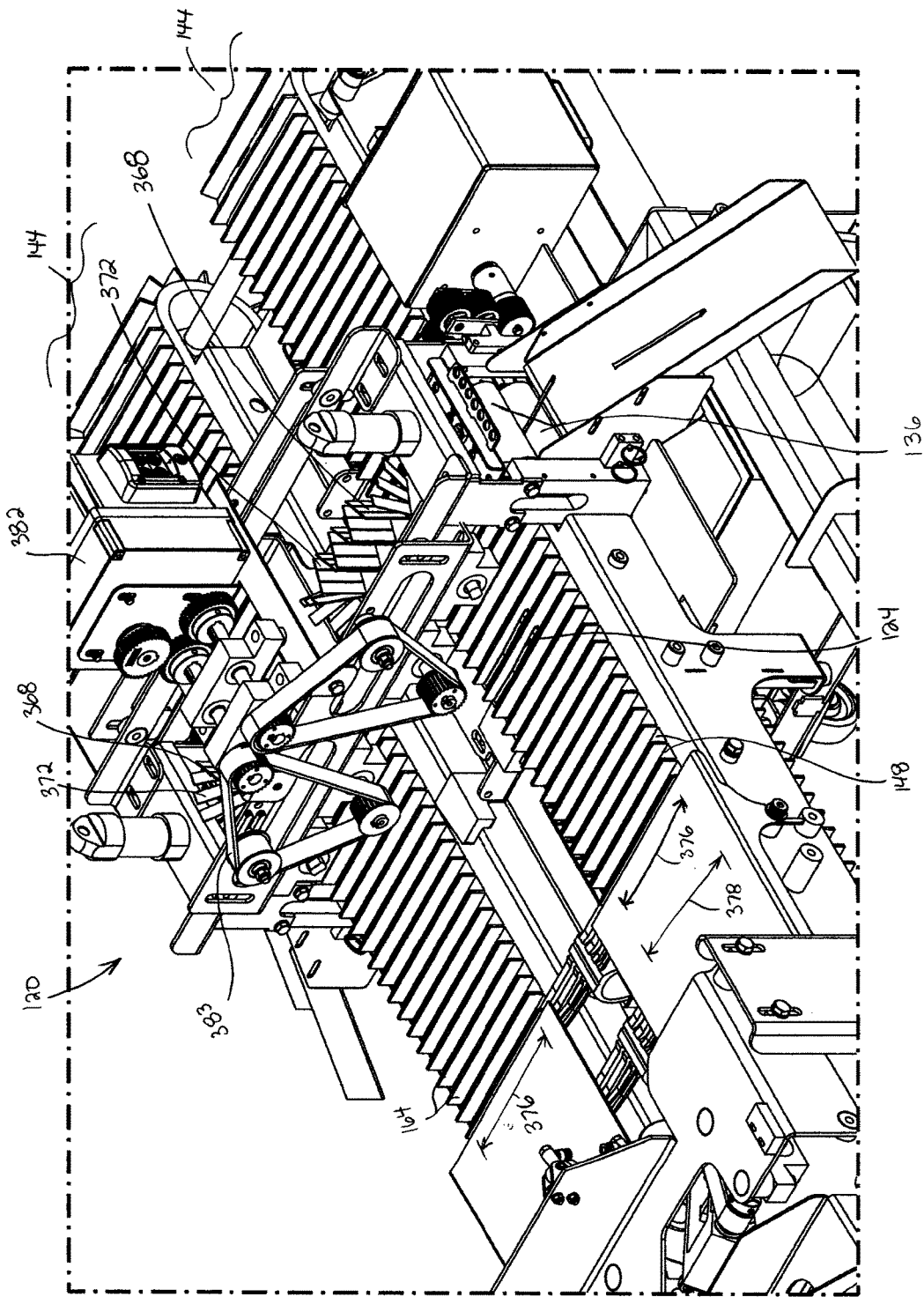
FIG. 14 is a front perspective view of a meat extraction station in accordance with an embodiment.
Figure 15:
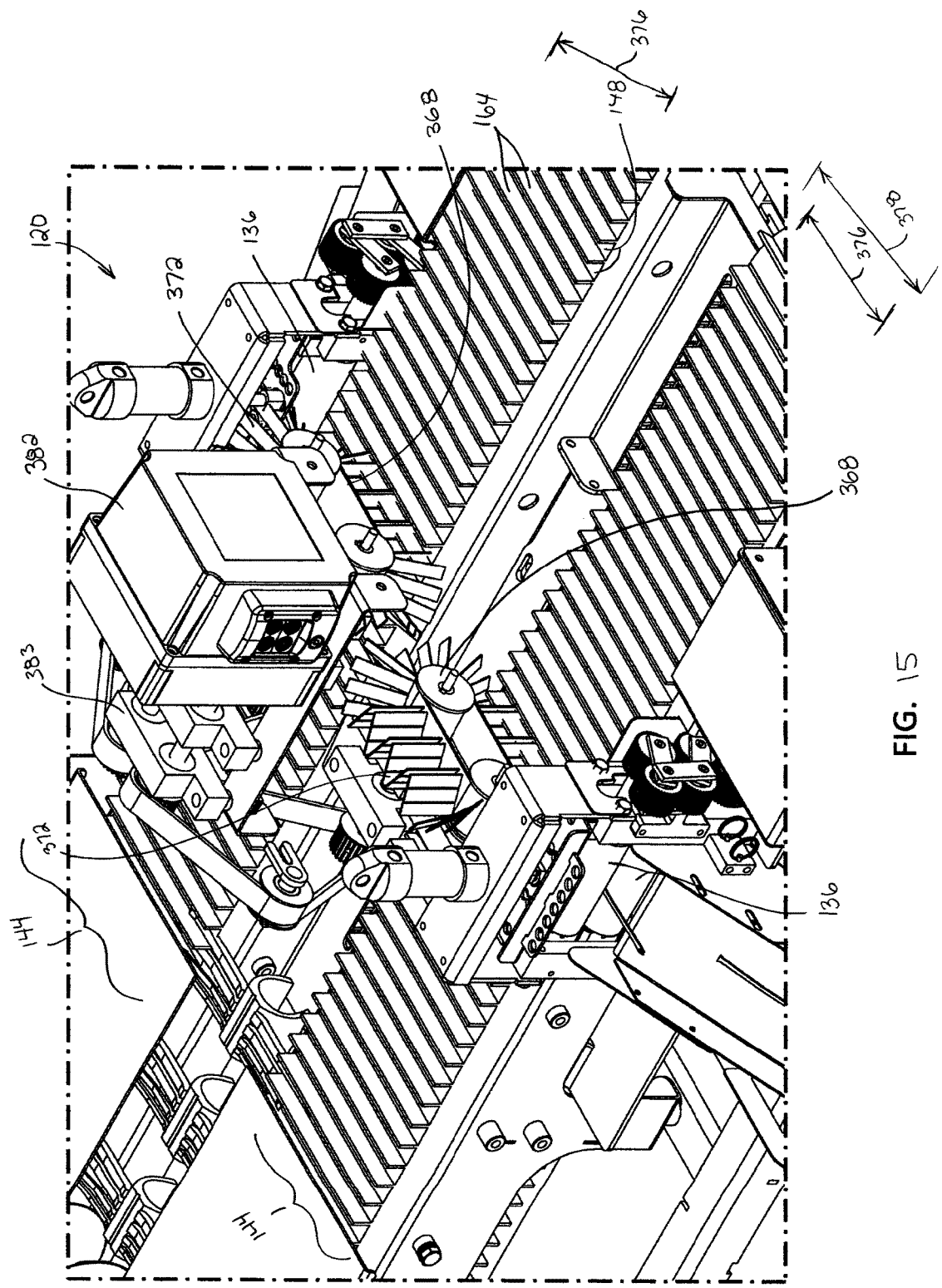
FIG. 15 is a rear perspective view of the meat extraction station of FIG. 14.

Reference is now made to FIGS. 14-15, which show a meat extraction station 120 in accordance with another embodiment. As shown, meat extraction station 120 may include one or more ejection conveyors 368 that act to convey dismembered crustacean legs 124 into engagement with meat extraction rollers 136. Each ejection conveyor 368 may include a plurality of conveyor projections 372 that move into and laterally outwardly along conveyor leg slots 148 to urge crustacean legs 124 positioned therein to move laterally outwardly into engagement with meat extraction rollers 136. As shown, ejection conveyors 368 may be positioned above conveyor 104.

Meat extraction station 120 can include any number of ejection conveyors 368. For example, meat extraction station 120 may include one ejection conveyor 368 positioned over each conveyor leg region 144 of conveyor 104, as shown, or a plurality of ejection conveyors 368 over each conveyor leg region 144. Each ejection conveyor 368 may have a plurality of conveyor projections 372 that are positioned and dimensioned to collectively engage one or a plurality of conveyor leg slots 148 simultaneously. For example, ejection conveyor 368 has conveyor projections 372 that are positioned and dimensioned to engage three conveyor leg slots 148 simultaneously, as shown. This may allow conveyor projections 372 to collectively move along substantially the entire lateral (i.e. cross-machine direction) stroke of the conveyor projections 372 within each slot 148 as conveyor 104 continues to advance in the machine direction. In other embodiments, conveyor 104 may pause intermittently to allow ejection conveyor 368 to eject crustacean legs 124 into meat extraction rollers 136.

Still referring to FIGS. 14 and 15, conveyor projections 372 may move along a continuous path, and during a portion of that path conveyor projections 372 may move laterally (i.e. in a cross-machine direction) in engagement with (e.g. while extending into) conveyor leg slots 148. The lateral (i.e. cross-machine direction) length of that engagement between conveyor projections 372 and conveyor leg slots 148 may be referred as an engagement length 376. Each ejection conveyor 368 may include any engagement length 376 that can allow conveyor projections 372 to collectively move crustacean legs 124 into engagement with meat extraction rollers 136. In some embodiments, the engagement length 376 is greater than ½ of the conveyor leg slot length 378. For example, engagement length 376 may be greater than ¾ of the conveyor leg slot length 378 as shown. This can promote the successful transfer of crustacean legs 124 into engagement with meat extraction rollers 136.

Conveyor projections 372 can have any structure that allows them to move crustacean legs 124 along conveyor leg slots 148 into engagement with meat extraction rollers 136, and that will not unduly obstruct machine-direction movement of conveyor 104 as leg slot walls 164 move through conveyor projections 372. In some embodiments, conveyor projections 372 may include soft (i.e. flexible) paddles as shown, rigid paddles, or bristles (soft and/or rigid) for example.

Ejection conveyors 368 may be driven in any manner. In the illustrated example, both ejection conveyors 368 are driven by a common motor 382. The opposite rotating directions are provided by a transmission 383. In other embodiments, each ejection conveyor 368 may be driven independently by a different motor.

Figure 16:
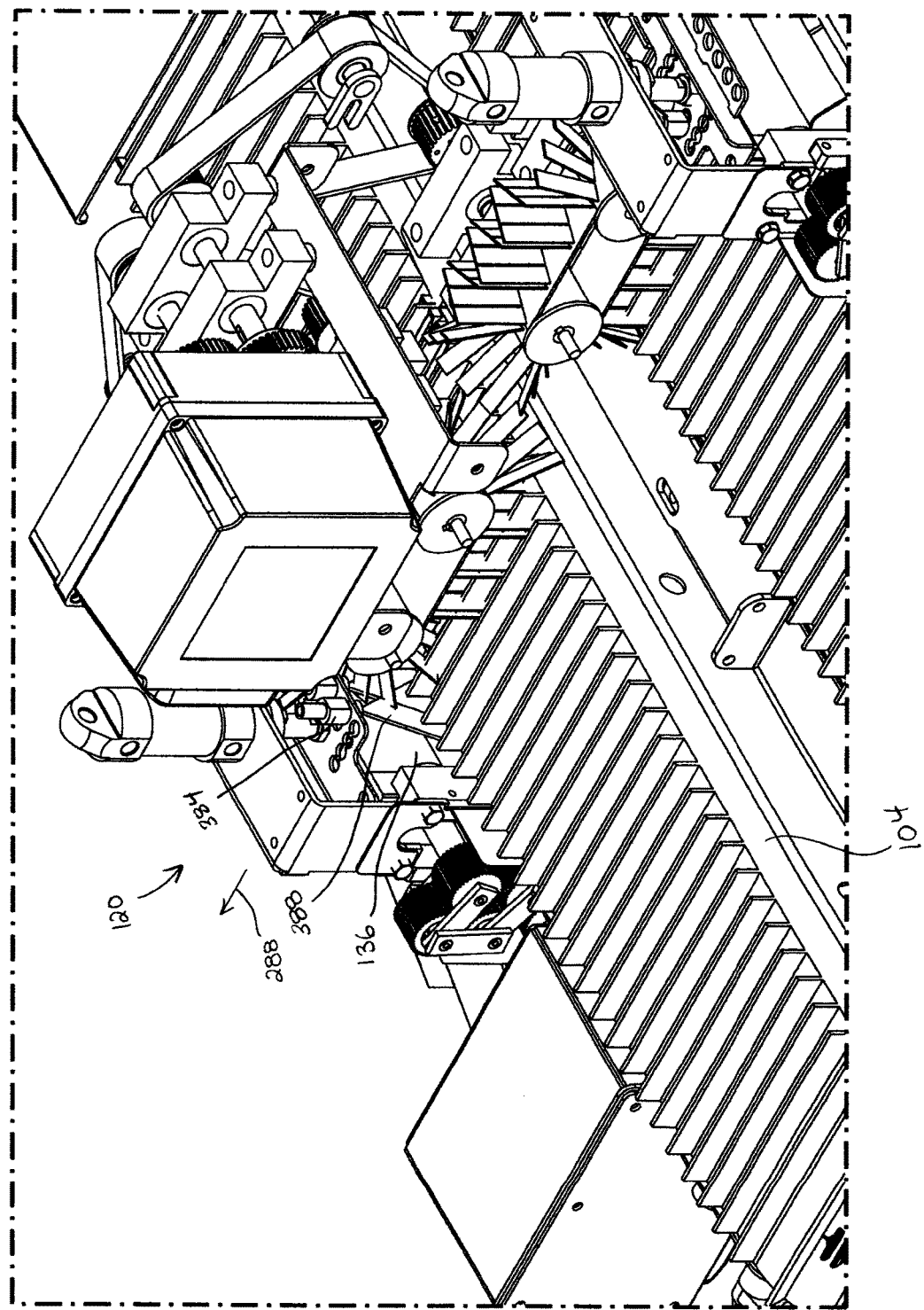
FIG. 16 is a rear perspective view of a meat extraction station of FIG. 14 in accordance with an embodiment.
Figure 17:
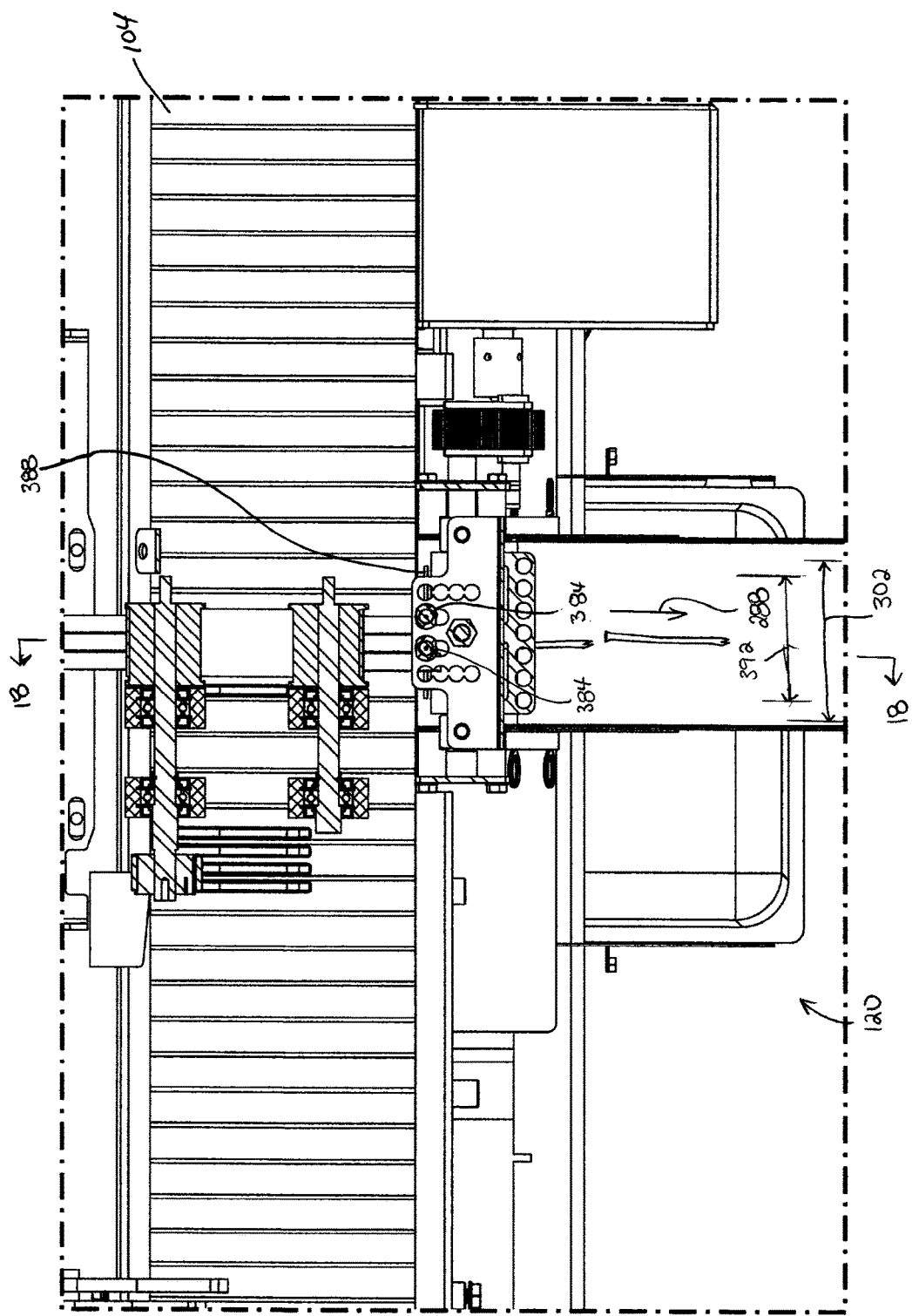
FIG. 17 is a partial top plan view of the meat extraction station of FIG. 16.
Figure 18:
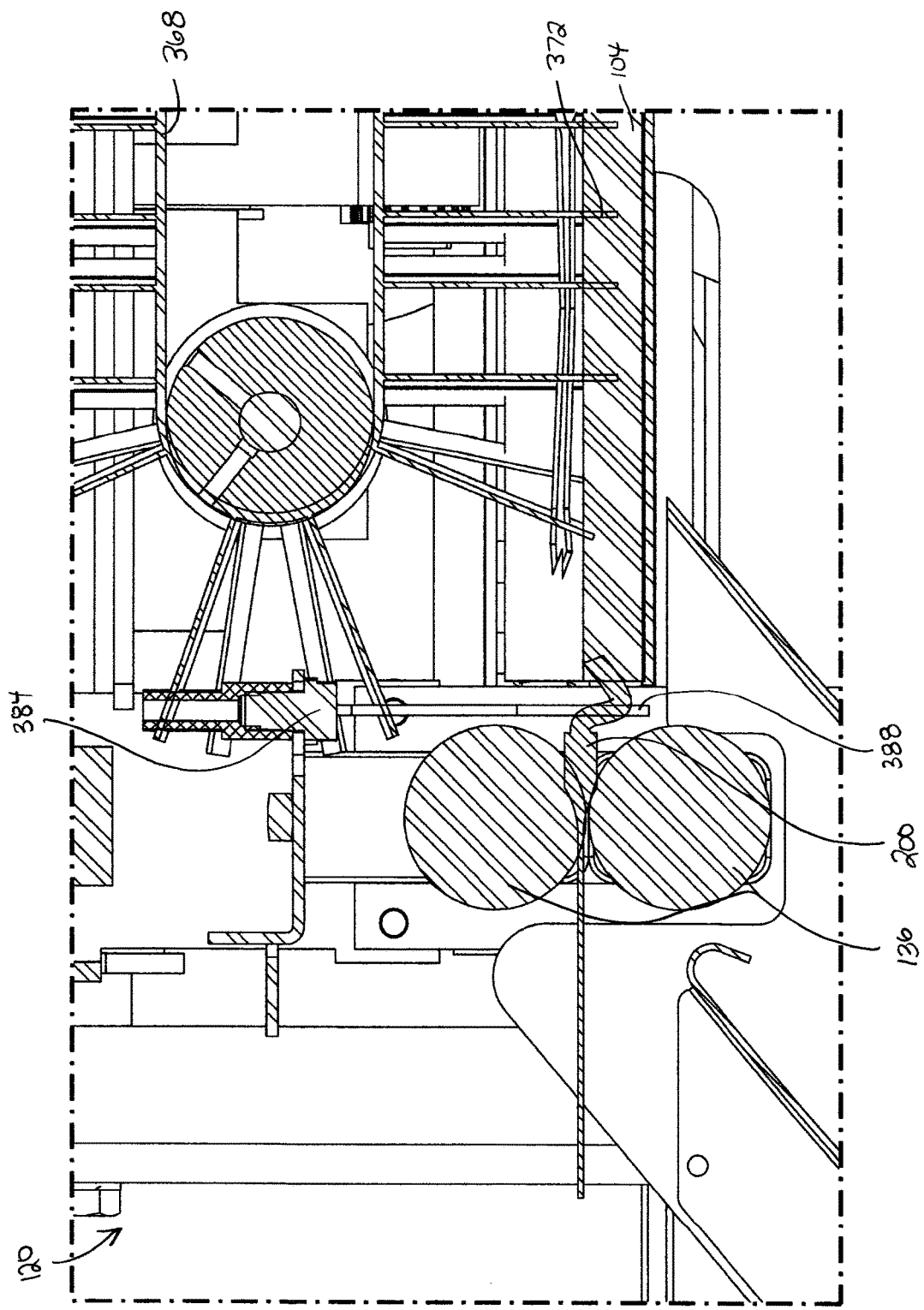
FIG. 18 is a cross-sectional view taken along lines 18-18 in FIG. 17.

Reference is now made to FIGS. 16-18. As shown, meat extraction station 120 may include one or more spray nozzles 384 positioned and oriented to spray fluid jets 388 against leg meat 200 as it is extracted by meat extraction rollers 136. The fluid jets 388 may be oriented transverse to a downstream direction 288 through meat extraction rollers 136, and directed between the meat extraction rollers 136 and conveyor 104. This allows fluid jets 388 to deflect (e.g. bend) the leg meat 200 away from meat extraction rollers 136. This may help prevent the leg meat 200 from entering meat extraction rollers 136, and instead encourage the leg meat 200 to collect in a leg meat receptacle (not shown).

Spray nozzles 384 may have any position and orientation suitable for spraying fluid jets 388 that deflect leg meat 200 from entering meat extraction rollers 136. In the illustrated example, spray nozzles 384 are positioned and oriented to spray fluid jets 388 downwardly between conveyor 104 and meat extraction rollers 136. In other embodiments, spray nozzles 384 may be oriented to spray fluid jets 388 in a different direction transverse to roller downstream direction 288, such as horizontally or upwardly for example.

Meat extraction station 120 may include any number of spray nozzles 384. For example, meat extraction station 120 may include one or a plurality of spray nozzles 384 associated with each respective lateral side of conveyor 104. In the illustrated example, meat extraction station 120 includes two spray nozzles 384 for each lateral side of conveyor 104. Where a plurality of spray nozzles 384 are provided on one lateral side of conveyor 104, those spray nozzles 384 may be the same or different, may be oriented the same or differently, and may be arranged side-by-side in the machine direction or cross-machine direction. In the example shown, the spray nozzles 384 are the same, oriented the same, and arranged side-by-side in a machine direction.

Spray nozzles 384 may be configured to produce any suitable type of fluid jet 388. The fluid jet 388 may be intermittent or continuous. The spray nozzle(s) 384 associated with the meat extraction rollers 136 of one lateral side of conveyor 104 may produce fluid jet(s) 388 having any suitable machine-direction spray width 392. In some embodiment, the spray nozzle(s) collectively form a fluid curtain (e.g. water curtain) having a width 392 that is at least ½ of the roller width 302. In the illustrated embodiment, spray nozzle(s) collectively form a fluid curtain having a width 392 that is at least ¾ of the roller width 302. This allows the fluid jet(s) 388 to act upon crustacean leg meat 200 that may be extracting from different positions along the meat extraction rollers 136.

Spray nozzles 384 may spray any fluid (liquid or gas). Preferably, the fluid should be safe for contact with food. For example, spray nozzles 384 may spray a liquid, such as clean (i.e. potable) water.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A method of removing meat from crustacean legs, the method comprising:
    placing a crustacean on a conveyor, the crustacean having a plurality of crustacean legs extending from a crustacean body, the conveyor carrying the crustacean in a machine direction and the conveyor having a plurality of leg slots extending in a cross-machine direction;
    extending the crustacean legs outwardly from the crustacean body into the legs slots; and
    moving the crustacean legs along the legs slots into meat extraction rollers.

Item 2: The method of item 1, wherein:
    said extending the crustacean legs outwardly from the crustacean body into the leg slots comprises receiving the crustacean legs between laterally extending upstanding walls that are spaced apart in the machine direction to define the leg slots.

Item 3: The method of any one of items 1-2, wherein:
    said moving the crustacean legs along the leg slots into meat extraction rollers comprises directing a flow of pressurized fluid laterally against the crustacean legs to move the crustacean legs laterally outwardly into engagement with the meat extraction rollers.

Item 4: The method of any one of items 1-3, further comprising:
    drawing shells of the crustacean legs through the meat extraction rollers; and
    applying vacuum suction to leg meat of the crustacean legs to resist movement of the leg meat through the meat extraction rollers with the shells.

Item 5: The method of any one of items 1-3, further comprising:
    drawing the shell through the meat extraction rollers; and
    grasping the leg meat upstream of the meat extraction rollers using a mechanical gripper to resist movement of the leg meat through the meat extraction rollers with the shell.

Item 6: The method of item 1, further comprising:
    brushing the crustacean legs, with at least one brush roller, away from the crustacean body to straighten the crustacean legs into the leg slots.

Item 7: The method of item 6, wherein:
    said brushing comprises the brush roller applying forces to the crustacean legs downwardly and outwardly away from the crustacean body.

Item 8: The method of item 6, further comprising:
    after said brushing, transporting the crustacean legs under a retaining wall, the retaining wall at least limiting upward curling of the crustacean legs out of the leg slots.
Item 9: The method of item 1, wherein:
    said moving the crustacean legs along the leg slots comprises applying forces to the crustacean legs in the cross-machine direction with an ejection conveyor.
Item 10: The method of item 1, wherein:
    said moving the crustacean legs into the meat extraction rollers comprises passing crustacean leg shells downstream through the meat extraction rollers and extracting crustacean leg meat from the crustacean leg shells upstream of the meat extraction rollers, and
    the method further comprising deflecting the extracting crustacean leg transverse to a downstream direction through the meat extraction rollers using one or more fluid jets.
Item 11: An apparatus for removing meat from crustacean legs, the apparatus comprising:
    a conveyor having a crustacean body region flanked by laterally opposed crustacean leg regions, each crustacean leg region including a plurality of leg slots extending laterally outwardly of the crustacean body region; and
    a plurality of leg meat extraction rollers, positioned laterally outwardly of the leg slots and oriented to receive crustacean legs moved laterally outwardly from the leg slots.
Item 12: The apparatus of item 11, wherein:
    the conveyor comprises a plurality of laterally extending upstanding walls that are spaced apart in the machine direction to define the leg slots.
Item 13: The apparatus of any one of items 11-12, further comprising:
    a fluid nozzle positioned and oriented to direct a flow of pressurized fluid across the conveyor to carry a crustacean leg supported on the conveyor into engagement with the meat extraction roller.
Item 14: The apparatus of any one of items 11-13, wherein:
    the meat extraction rollers have a crustacean leg inlet and define a downstream direction; and
    the apparatus further comprises a suction conduit having an inlet end positioned upstream of the meat extraction rollers proximate the crustacean leg inlet, wherein the suction conduit is connectable with a suction source and is sized to receive crustacean leg meat.
Item 15: The apparatus of any one of items 11-13, wherein:
    the meat extraction rollers have an inlet path extending downstream to the meat extraction rollers; and
    the apparatus further comprises a mechanical gripper located upstream of the meat extraction rollers, the mechanical gripper having at least two fingers, and being movable from an open position in which the fingers flank the inlet path, and a gripping position in which the fingers collectively grasp at the inlet path.
Item 16: The apparatus of item 11, further comprising:
    first and second brush rollers, each brush roller positioned to extend into the leg slots of a respective one of the crustacean leg regions.
Item 17: The apparatus of item 16, further comprising:
    a retaining wall overlaying the conveyor downstream of the first and second brush rollers.
Item 18: The apparatus of item 11, further comprising:
    at least one ejection conveyor have conveyor projections, the ejection conveyor when operated moving the conveyor projections outwardly in a cross-machine direction along the leg slots towards at least one pair of the leg meat extraction rollers.
Item 19: The apparatus of item 11, further comprising:
    at least one spray nozzle positioned and oriented to spray a fluid jet between the conveyor and one of the meat extraction rollers in a direction transverse to a downstream direction of the one pair of the meat extraction rollers.
Item 20: The apparatus of item 19, wherein:
    the spray nozzle is oriented to spray the fluid jet downwardly, and the downstream direction is substantially horizontal.
Item 21: A method of removing meat from crustacean legs, the method comprising:
    conveying a crustacean leg on a conveyor in a machine direction; and
    directing a flow of pressurized fluid in a cross-machine direction against the crustacean leg to move the crustacean leg outwardly in the cross-machine direction into engagement with meat extraction rollers.
Item 22: The method of item 21, wherein:
    directing the flow of pressurized fluid comprises directing pressurized gas.
Item 23: The method of item 21, wherein:
    directing the flow of pressurized fluid comprises directing pressurized liquid.
Item 24: The method of any one of items 21-23, further comprising:
    moving the crustacean leg through a funnel into engagement with the meat extraction rollers.
Item 25: The method of any one of items 21-24, further comprising:
    drawing a shell of the crustacean leg through the meat extraction rollers; and
    applying vacuum suction to leg meat of the crustacean leg to resist movement of the leg meat through the meat extraction rollers with the shell.
Item 26: The method of any one of items 21-23, further comprising:
    drawing a shell of the crustacean leg through the meat extraction rollers; and
    grasping leg meat of the crustacean leg upstream of the meat extraction rollers using a mechanical gripper to resist movement of the leg meat through the meat extraction rollers with the shell.
Item 27: An apparatus for removing meat from crustacean legs, the apparatus comprising:
    a conveyor sized to support a plurality of crustacean legs;
    a meat extraction roller positioned laterally outwardly of the conveyor; and
    a fluid nozzle positioned and oriented to direct a flow of pressurized fluid across the conveyor to carry a crustacean leg supported on the conveyor into engagement with the meat extraction roller.
Item 28: The apparatus of item 27, wherein:
    the meat extraction rollers have a crustacean leg inlet and defining a downstream direction; and
    the apparatus further comprises a suction conduit having an inlet end positioned upstream of the meat extraction rollers proximate the crustacean leg inlet, wherein the suction conduit is connectable with a suction source and is sized to receive crustacean leg meat.
Item 29: The apparatus of any one of items 27-28, wherein:
    the meat extraction rollers have an inlet path extending downstream to the meat extraction rollers; and the apparatus further comprises a mechanical gripper located upstream of the meat extraction rollers, the mechanical gripper having at least two fingers, and being movable from an open position in which the fingers flank the inlet path, and a gripping position in which the fingers collectively grasp at the inlet path.

Item 30: A method of removing meat from crustacean legs, the method comprising:
moving a crustacean leg into engagement with meat extraction rollers, the crustacean leg including leg meat and a shell;
drawing the shell through the meat extraction rollers; and
applying vacuum suction to the leg meat to resist movement of the leg meat through the meat extraction rollers with the shell.

Item 31: The method of item 30, further comprising:
grasping the leg meat upstream of the meat extraction rollers using a mechanical gripper to resist movement of the leg meat through the meat extraction rollers with the shell.

Item 32: The method of item 31, further comprising:
after the shell is drawn through the meat extraction rollers, ceasing to grasp the leg meat whereby the vacuum suction moves the leg meat away from the meat extraction rollers.

Item 33: An apparatus for removing meat from crustacean legs, the apparatus comprising:
meat extraction rollers having a crustacean leg inlet and defining a downstream direction; and
a suction conduit having an inlet end positioned upstream of the meat extraction rollers proximate the crustacean leg inlet, wherein the suction conduit is connectable with a suction source and is sized to receive crustacean leg meat.

Item 34: The apparatus of item 33, further comprising:
a mechanical gripper located upstream of the meat extraction rollers, the mechanical gripper having at least two fingers, and being movable from an open position in which the fingers flank the inlet path, and a gripping position in which the fingers collectively grasp at the inlet path.

Item 35: A method of removing meat from crustacean legs, the method comprising:
moving a crustacean leg into engagement with meat extraction rollers, the crustacean leg including leg meat and a shell;
drawing the shell through the meat extraction rollers; and
grasping the leg meat upstream of the meat extraction rollers using a mechanical gripper to resist movement of the leg meat through the meat extraction rollers with the shell.

Item 36: The method of item 35, further comprising:
detecting the crustacean leg moving towards engagement with the meat extraction rollers,
wherein said grasping is performed in response to said detecting.

Item 37: An apparatus for removing meat from crustacean legs, the apparatus comprising:
meat extraction rollers having an inlet path extending downstream to the meat extraction rollers; and
a mechanical gripper located upstream of the meat extraction rollers, the mechanical gripper having at least two fingers, and being movable from an open position in which the fingers flank the inlet path, and a gripping position in which the fingers collectively grasp at the inlet path.

Item 38: The apparatus of item 37, further comprising:
a sensor positioned and oriented to detecting when a crustacean leg is moved towards engagement with the meat extraction rollers.

Item 39: The apparatus of item 38, wherein:
the mechanical gripper is configured to move to the gripping position in response to the sensor detecting that the crustacean leg has moved towards engagement with the meat extraction rollers.

Item 40: A method of processing crustacean legs, the method comprising:
transporting a pre-cooked crustacean on a conveyor, the crustacean having a plurality of crustacean legs extending from a crustacean body, the conveyor carrying the crustacean in a machine direction and the conveyor having a plurality of leg slots extending in a cross-machine direction, the crustacean legs extending outwardly from the crustacean body at least partially into the legs slots; and
brushing the crustacean legs, with at least one brush roller, away from the crustacean body to straighten the crustacean legs into the leg slots.

Item 41: The method of item 40, wherein:
said brushing comprises the brush roller applying forces to the crustacean legs downwardly and outwardly away from the crustacean body.

Item 42: The method of item 40, wherein:
the plurality of crustacean legs includes first crustacean legs extending in a first lateral direction from the crustacean body, and second crustacean legs extending in a second lateral direction from the crustacean body,
the at least one brush roller comprises a first brush roller and a second brush roller, and
said brushing comprises brushing the first crustacean legs with the first brush roller away from the crustacean body to straighten the first crustacean legs into the leg slots, and brushing the second crustacean legs with the second brush roller away from the crustacean body to straighten the second crustacean legs into the leg slots.

Item 43: The method of item 42, wherein:
said brushing comprises rotating the first brush roller and the second brush roller in opposite directions.

Item 44: The method of any one of items 40-42, further comprising:
after said brushing, transporting the crustacean legs under a retaining wall, the retaining wall at least limiting upward curling of the crustacean legs out of the leg slots.

Item 45: The method of item 44, wherein:
the retaining wall extends parallel to the machine direction.

Item 46: The method of any one of items 40-45, further comprising:
moving the crustacean legs along the leg slots into meat extraction rollers.

Item 47: The method of item 46, wherein:
said moving the crustacean legs along the leg slots comprises applying forces to the crustacean legs in the cross-machine direction with an ejection conveyor.

Item 48: The method of item 47, wherein:
said applying forces with the ejection conveyor comprises sweeping ejection conveyor projections along the leg slots in the cross-machine direction.

Item 49: The method of any one of items 46-48, wherein:
said moving the crustacean legs into the meat extraction rollers comprises passing crustacean leg shells downstream through the meat extraction rollers and extracting crustacean leg meat from the crustacean leg shells upstream of the meat extraction rollers.

Item 50: The method of item 49, further comprising:
deflecting the extracting crustacean leg transverse to a downstream direction through the meat extraction rollers using one or more fluid jets.

Item 51: An apparatus for processing crustacean legs, the apparatus comprising:
a conveyor having a crustacean body region flanked by laterally opposed crustacean leg regions, each crustacean leg region including a plurality of leg slots extending laterally outwardly of the crustacean body region; and
first and second brush rollers, each brush roller positioned to extend into the leg slots of a respective one of the crustacean leg regions.

Item 52: The apparatus of item 51, wherein:
the first and second brush rollers are positioned and oriented to brush the leg slots outwardly in a cross-machine direction when rotated.

Item 53: The apparatus of any one of items 51-52, further comprising:
a retaining wall overlaying the conveyor downstream of the first and second brush rollers.

Item 54: The apparatus of item 53, wherein:
the conveyor has a machine direction, and the retaining wall extends parallel to the machine direction.

Item 55: The apparatus of any one of items 51-54, further comprising:
a plurality of leg meat extraction rollers, each leg meat extraction roller positioned laterally outwardly of the leg slots and oriented to receive crustacean legs moved laterally outwardly from the leg slots.

Item 56: The apparatus of item 55, further comprising:
at least one ejection conveyor have conveyor projections, the ejection conveyor when operated moving the conveyor projections outwardly in a cross-machine direction along the leg slots towards at least one pair of the leg meat extraction rollers.

Item 57: The apparatus of any one of items 55-56, further comprising:
at least one spray nozzle positioned and oriented to spray a fluid jet between the conveyor and one of the meat extraction rollers in a direction transverse to a downstream direction of the one pair of the meat extraction rollers.

Item 58: The apparatus of item 57, wherein:
the spray nozzle is oriented to spray the fluid jet downwardly, and the downstream direction is substantially horizontal.

The invention claimed is:

1. A method of removing meat from crustacean legs, the method comprising:
placing a crustacean on a conveyor, the crustacean having a plurality of crustacean legs extending from a crustacean body, the conveyor carrying the crustacean in a machine direction and the conveyor having a plurality of leg slots extending in a cross-machine direction;
extending the crustacean legs outwardly from the crustacean body into the legs slots; and
moving the crustacean legs along the legs slots into meat extraction rollers.

2. The method of claim 1, wherein:
said extending the crustacean legs outwardly from the crustacean body into the leg slots comprises receiving the crustacean legs between laterally extending upstanding walls that are spaced apart in the machine direction to define the leg slots.

3. The method of claim 1, wherein:
said moving the crustacean legs along the leg slots into meat extraction rollers comprises directing a flow of pressurized fluid laterally against the crustacean legs to move the crustacean legs laterally outwardly into engagement with the meat extraction rollers.

4. The method of claim 1, further comprising:
drawing shells of the crustacean legs through the meat extraction rollers; and
applying vacuum suction to leg meat of the crustacean legs to resist movement of the leg meat through the meat extraction rollers with the shells.

5. The method of claim 1, further comprising:
drawing the shell through the meat extraction rollers; and
grasping the leg meat upstream of the meat extraction rollers using a mechanical gripper to resist movement of the leg meat through the meat extraction rollers with the shell.

6. The method of claim 1, further comprising:
brushing the crustacean legs, with at least one brush roller, away from the crustacean body to straighten the crustacean legs into the leg slots.

7. The method of claim 6, wherein:
said brushing comprises the brush roller applying forces to the crustacean legs downwardly and outwardly away from the crustacean body.

8. The method of claim 6, further comprising:
after said brushing, transporting the crustacean legs under a retaining wall, the retaining wall at least limiting upward curling of the crustacean legs out of the leg slots.

9. The method of claim 1, wherein:
said moving the crustacean legs along the leg slots comprises applying forces to the crustacean legs in the cross-machine direction with an ejection conveyor.

10. The method of claim 1, wherein:
said moving the crustacean legs into the meat extraction rollers comprises passing crustacean leg shells downstream through the meat extraction rollers and extracting crustacean leg meat from the crustacean leg shells upstream of the meat extraction rollers, and
the method further comprising deflecting the extracting crustacean leg transverse to a downstream direction through the meat extraction rollers using one or more fluid jets.

11. An apparatus for removing meat from crustacean legs, the apparatus comprising:
a conveyor having a crustacean body region flanked by laterally opposed crustacean leg regions, each crustacean leg region including a plurality of leg slots extending laterally outwardly of the crustacean body region; and
a plurality of leg meat extraction rollers, positioned laterally outwardly of the leg slots and oriented to receive crustacean legs moved laterally outwardly from the leg slots.

12. The apparatus of claim 11, wherein:
the conveyor comprises a plurality of laterally extending upstanding walls that are spaced apart in the machine direction to define the leg slots.

13. The apparatus of claim 11, further comprising:
a fluid nozzle positioned and oriented to direct a flow of pressurized fluid across the conveyor to carry a crustacean leg supported on the conveyor into engagement with the meat extraction roller.

14. The apparatus of claim 11, wherein:
the meat extraction rollers have a crustacean leg inlet and define a downstream direction; and
the apparatus further comprises a suction conduit having an inlet end positioned upstream of the meat extraction rollers proximate the crustacean leg inlet, wherein the suction conduit is connectable with a suction source and is sized to receive crustacean leg meat.

15. The apparatus of claim 11, wherein:
the meat extraction rollers have an inlet path extending downstream to the meat extraction rollers; and
the apparatus further comprises a mechanical gripper located upstream of the meat extraction rollers, the mechanical gripper having at least two fingers, and being movable from an open position in which the fingers flank the inlet path, and a gripping position in which the fingers collectively grasp at the inlet path.

16. The apparatus of claim 11, further comprising:
first and second brush rollers, each brush roller positioned to extend into the leg slots of a respective one of the crustacean leg regions.

17. The apparatus of claim 16, further comprising:
a retaining wall overlaying the conveyor downstream of the first and second brush rollers.

18. The apparatus of claim 11, further comprising:
at least one ejection conveyor have conveyor projections, the ejection conveyor when operated moving the conveyor projections outwardly in a cross-machine direction along the leg slots towards at least one pair of the leg meat extraction rollers.

19. The apparatus of claim 11, further comprising:
at least one spray nozzle positioned and oriented to spray a fluid jet between the conveyor and one of the meat extraction rollers in a direction transverse to a downstream direction of the one pair of the meat extraction rollers.

20. The apparatus of claim 19, wherein:
the spray nozzle is oriented to spray the fluid jet downwardly, and the downstream direction is substantially horizontal.

* * * * *